US010863069B2

(12) United States Patent
Hwang et al.

(10) Patent No.: US 10,863,069 B2
(45) Date of Patent: Dec. 8, 2020

(54) IMAGE PROCESSING SYSTEM AND SETTING METHOD

(71) Applicant: OMRON Corporation, Kyoto (JP)

(72) Inventors: Jaewook Hwang, Kyoto (JP); Shingo Inazumi, Amagasaki (JP); Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 43 days.

(21) Appl. No.: 16/221,592

(22) Filed: Dec. 17, 2018

(65) Prior Publication Data

US 2019/0268517 A1    Aug. 29, 2019

(30) Foreign Application Priority Data

Feb. 26, 2018  (JP) ................................ 2018-031747

(51) Int. Cl.
*H04N 5/225* (2006.01)
*H04N 5/232* (2006.01)
(Continued)

(52) U.S. Cl.
CPC ....... *H04N 5/2256* (2013.01); *G01N 21/8806* (2013.01); *G01N 21/8851* (2013.01);
(Continued)

(58) Field of Classification Search
CPC .............. H04N 5/2256; H04N 5/23229; G06T 7/0004; G06T 2207/10024; G06T 2207/10152; G06T 2207/30164; G06K 9/036; G06K 9/2027; G06K 9/2036; G06K 9/3241; G06K 9/3233; G06K 9/4652; G06K 9/4661; G06F 3/04845; G05B 19/4183; G05B 2219/31282; G03B 15/02; G03B 2215/0539; G01N 21/8806; G01N 21/8851
See application file for complete search history.

(56) References Cited

U.S. PATENT DOCUMENTS

| 5,060,065 A | * | 10/1991 | Wasserman | ........ | G01N 21/8806 348/131 |
| 6,207,946 B1 | * | 3/2001 | Jusoh | ................. | G01N 21/8806 250/208.1 |

(Continued)

FOREIGN PATENT DOCUMENTS

| CN | 106323987 | 1/2017 |
| JP | 2009128345 | 6/2009 |
| JP | 2015232487 | 12/2015 |

OTHER PUBLICATIONS

"Search Report of Europe Counterpart Application", dated Jul. 12, 2019, p. 1-p. 10.

(Continued)

*Primary Examiner* — Lin Ye
*Assistant Examiner* — Chriss S Yoder, III
(74) *Attorney, Agent, or Firm* — JCIPRNET

(57) ABSTRACT

An image processing system and a setting method capable of performing lighting setting of illumination in a simpler manner are provided. The control device (100) evaluates evaluation lighting patterns (xi) one by one to calculate evaluation values (Pi), and uses coefficients ($1_i$) determined based on the evaluation values (Pi) to linearly combine each evaluation lighting pattern (xi) to determine a lighting pattern for measurement (L).

18 Claims, 14 Drawing Sheets

(51) Int. Cl.
  *G06K 9/32* (2006.01)
  *G06K 9/20* (2006.01)
  *G06F 3/0484* (2013.01)
  *G06T 7/00* (2017.01)
  *G01N 21/88* (2006.01)
  *G03B 15/02* (2006.01)
  *G06K 9/03* (2006.01)
  *G06K 9/46* (2006.01)

(52) U.S. Cl.
  CPC ......... *G03B 15/02* (2013.01); *G06F 3/04845* (2013.01); *G06K 9/036* (2013.01); *G06K 9/2027* (2013.01); *G06K 9/2036* (2013.01); *G06K 9/3233* (2013.01); *G06K 9/3241* (2013.01); *G06K 9/4652* (2013.01); *G06K 9/4661* (2013.01); *G06T 7/0004* (2013.01); *H04N 5/23229* (2013.01); *G06T 2207/10024* (2013.01); *G06T 2207/10152* (2013.01); *G06T 2207/30164* (2013.01)

(56) References Cited

U.S. PATENT DOCUMENTS

| | | | |
|---|---|---|---|
| 6,542,180 B1 * | 4/2003 | Wasserman | G01N 21/8806 348/131 |
| 6,627,863 B2 * | 9/2003 | Wasserman | G01J 1/32 250/205 |
| 6,987,876 B2 * | 1/2006 | Silber | G01J 1/32 250/205 |
| 7,016,525 B2 * | 3/2006 | Gladnick | G06T 1/0007 356/237.1 |
| 2009/0103080 A1 | 4/2009 | Oomori et al. | |

OTHER PUBLICATIONS

Markus Jehle, et al., "Learning of Optimal Illumination for Material Classification," Pattern Recognition, Sep. 2010, pp. 563-572.

* cited by examiner

IMAGE PROCESSING SYSTEM AND SETTING METHOD

CROSS-REFERENCE TO RELATED APPLICATION

This application claims the priority of Japan patent application serial no. 2018-031747, filed on Feb. 26, 2018. The entirety of the above-mentioned patent application is hereby incorporated by reference herein and made a part of this specification.

BACKGROUND

Technical Field

The disclosure relates to an image processing system that performs image measurement using appearance images of a target, and a setting method used to perform lighting setting on an illumination part used in the image measurement.

Related Art

In the field of FA (Factory Automation) and so on, an image processing technology is used in which a target (hereinafter also referred to as "workpiece") is photographed under illumination of light from an illumination device and information related to the workpiece is obtained from the generated image data.

A variety of illumination devices are developed as the illumination devices used in the field of image processing technology. For example, in Japanese Patent Application Laid-Open No. 2009-128345 (Patent literature 1), an illumination device provided with a plurality of illumination parts having mutually different color light is disclosed. Besides, in Japanese Patent Application Laid-Open No. 2015-232487 (Patent literature 2), an illumination device provided with a plurality of illumination parts having different illumination directions is disclosed.

For the illumination device having multiple settable conditions such as illumination colors, illumination directions and the like, there are plenty of illumination patterns. When a user sets all the conditions such as illumination colors, illumination directions and the like from the beginning, the lighting setting of the illumination device may become complicated.

SUMMARY

According to one example of this disclosure, an image processing system that performs image measurement using appearance images of a target is provided. The image processing system includes: an imaging part that images a target; an illumination part configured of a plurality of illumination elements for illuminating light to the target and capable of adjusting light emission intensity for each illumination element; an image acquisition part that irradiates illumination light from the illumination part in accordance with each of a plurality of mutually different evaluation lighting patterns, and acquires at least one or more evaluation images corresponding to each evaluation lighting pattern from the imaging part; a setting receiving part that receives settings of an evaluation object image to be evaluated among the evaluation images acquired by the image acquisition part and evaluation object regions which are partial regions of one image and are to be evaluated; a feature amount calculation part that calculates a feature amount from evaluation object region in the evaluation object image corresponding to each evaluation lighting pattern; an evaluation value calculation part that calculates evaluation values corresponding to the evaluation lighting patterns based on the feature amount obtained by the feature amount calculation part; and a pattern determination part that calculates a linear combination of the evaluation lighting patterns by using coefficients determined based on the evaluation values obtained by the evaluation value calculation part, thereby determining the lighting pattern to be used in the image measurement.

According to another example of this disclosure, a setting method is provided which is used to perform lighting setting on an illumination part that is configured of a plurality of illumination elements for irradiating light to a target and configured to adjust a light emission intensity for each illumination element. The setting method includes: a step of irradiating illumination light from the illumination part in accordance with each of a plurality of mutually different evaluation lighting patterns, and acquiring at least one or more evaluation images corresponding to each evaluation lighting pattern from an imaging part; a step of calculating a feature amount from an evaluation object region in an evaluation object image among the one or more evaluation images corresponding to each evaluation lighting pattern; a step of calculating evaluation values corresponding to the evaluation lighting patterns based on the calculated feature amount; and a step of calculating a linear combination of the evaluation lighting patterns by using coefficients determined based on the calculated evaluation values, thereby determining a lighting pattern used for image measurement.

The aforementioned and other purposes, features, aspects and advantages of this disclosure are evident from the following detailed description which is understood in association with the accompanying drawings.

DESCRIPTION OF THE EMBODIMENTS

Figure 1:
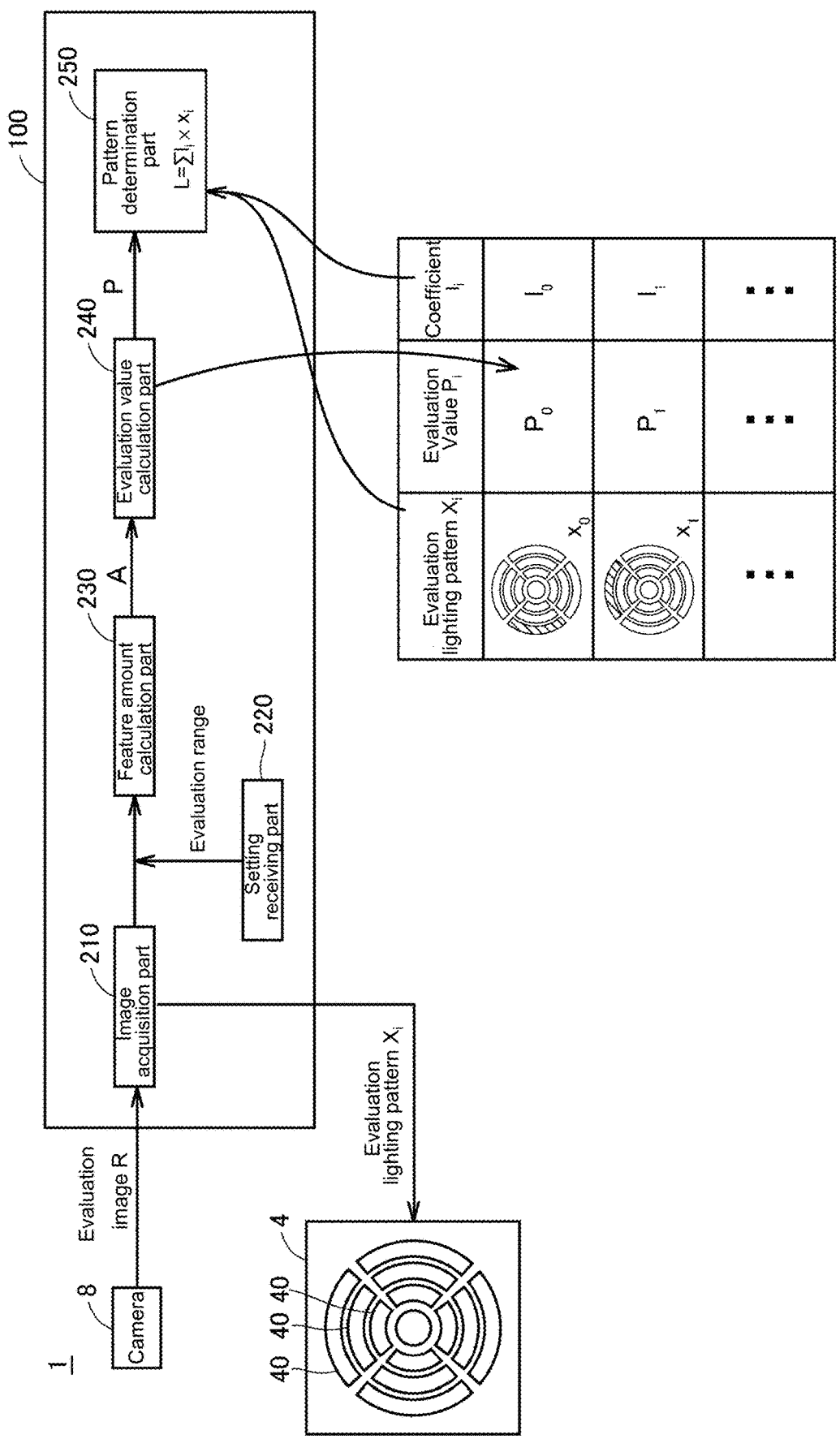
FIG. 1 is a diagram showing a configuration example of an image processing system 1.

As mentioned above, the present invention is directed to provide an image processing system and a setting method capable of performing lighting setting of illumination in a simpler manner.

According to this disclosure, the lighting pattern to be used in the image measurement is determined by calculating the linear combination of the evaluation lighting patterns, and thus the lighting setting of the illumination part can be performed in a simpler manner.

In the aforementioned disclosure, the evaluation lighting pattern may be a pattern in which one of the illumination elements or an assembly of the illumination elements located near each other is lighted and other illumination elements are not lighted.

According to this disclosure, the evaluation value means the value which represents the evaluation to the light incident on the target from a predetermined direction, and the light incident on the target from all directions can be evaluated separately.

In the aforementioned disclosure, the illumination part may be configured to be capable of selectively irradiating a light using a first wavelength as a main wavelength and a light using a second wavelength having a wavelength band different from the first wavelength as the main wavelength.

According to this disclosure, not only the light emission intensity but also the color of the light can be changed, and thus a more accurate image measurement can be performed.

In the aforementioned disclosure, the setting receiving part may further receive label information that corresponds to the evaluation object images and the evaluation object regions. Besides, the evaluation value calculation part may calculate the evaluation value based on the correspondence relation between the feature amount obtained from the evaluation object regions and the label information corresponding to the evaluation object regions.

According to this disclosure, the flexibility of the method to calculate the evaluation value is increased, and the user can calculate the evaluation value in accordance with the content of the image measurement.

In the aforementioned disclosure, the label information may be information that represents a state that defects exist in the evaluation object images and the evaluation object regions or information that represents a state that defects do not exist.

According to this disclosure, the lighting pattern suitable for defect inspection can be determined.

In the aforementioned disclosure, the feature amount may be at least one of contrast, color average, color deviation and edge amount.

According to this disclosure, the evaluation lighting pattern can be evaluated based on various types of feature amount, and thus the user can evaluate the evaluation lighting pattern in accordance with the content of the image measurement.

In the aforementioned disclosure, the evaluation value calculation part may calculate the evaluation value based on a magnitude of a difference between the feature amount calculated in the evaluation object images and two regions among the evaluation object regions, or the feature amount calculated in the evaluation object images and one region among the evaluation object regions, or a magnitude of a variation of the feature amounts calculated in the region.

According to this disclosure, in the image measurement, a lighting pattern in which the deviation of the feature amount in the images increases can be determined.

In the aforementioned disclosure, the pattern determination part may set a plurality of combinations of evaluation lighting patterns consisting of one or a plurality of evaluation lighting patterns that is selected from a plurality of evaluation lighting patterns, and calculate a sum of the evaluation values corresponding to the evaluation lighting patterns included in each combination.

According to this disclosure, the evaluation of the lighting pattern consisting of the combination of the evaluation lighting patterns can be easily performed based on the sum of the evaluation values.

In the aforementioned disclosure, the pattern determination part displays the lighting patterns represented by the combinations and a sum of the corresponding evaluation values, receives a selection to the displayed combination and determines the lighting pattern represented by the selected combination as the lighting pattern to be used in the image measurement.

According to this disclosure, the user can select the lighting patterns based on the sum of the evaluation values, and thus can set a highly illustrative lighting pattern for measurement. Besides, the sum of the evaluation values and the information representing the lighting pattern are associated and displayed, and thus the user can determine the lighting pattern for measurement after confirming the selected lighting patterns.

According to this disclosure, the lighting pattern to be used in the image measurement can be determined by calculating the linear combination of the evaluation lighting patterns, and thus the lighting setting of the illumination part can be performed in a simpler manner.

An image processing system and a setting method capable of performing the lighting setting of illumination in a simpler manner can be provided.

§ 1 Application Example

An application example of the disclosure is described with reference to FIG. 1. FIG. 1 is a diagram showing a configuration example of an image processing system 1.

The image processing system 1 is a system used to perform image measurement using appearance images of a target W. The image processing system 1 includes a camera 8 that is an example of an imaging part that images the target W, an illumination device 4 that is an example of an illumination part that irradiates light to the target W, and a control device 100 that controls the processing executed in the image processing system 1.

The illumination device 4 is configured of a plurality of illumination elements (partial regions 40) for irradiating light to the target W. In the example of FIG. 1, the illumination device 4 is configured of 13 partial regions 40. In FIG. 1, some symbols of the partial regions 40 are omitted. Moreover, the number of the partial regions 40 is not limited to the example shown in FIG. 1 and may be two or more. The sizes of the partial regions 40 may be different from or be the same with each other. The partial regions 40 may be arranged on a same plane or be arranged on mutually different planes as long as the partial regions 40 are arranged in a manner that light can be irradiated from each partial region 40 to the target W. The illumination device 4 is capable of adjusting light emission intensity for each partial region 40. Here, the capability of adjusting light emission intensity includes not only turning on or turning off of each partial region 40, but also stepwise adjustment of the intensity of light irradiated from each partial region 40.

Typically, the control device 100 has a structure in accordance with versatile computer architecture. The control device 100 includes an image acquisition part 210, a setting receiving part 220, a feature amount calculation part 230, an evaluation value calculation part 240, and a pattern determination part 250. Typically, the image acquisition part 210, the setting receiving part 220, the feature amount calculation part 230, the evaluation value calculation part 240, and the pattern determination part 250 are executed by a CPU included in the control device 100 executing programs stored in the control device 100 and so on.

The image acquisition part 210 irradiates illumination light from the illumination device 4 to the target W in accordance with each of a plurality of mutually different evaluation lighting patterns xi, and acquires at least one or more evaluation image R corresponding to each evaluation lighting pattern xi from the camera 8. The lighting patterns specify the light emission intensity of each partial region 40.

The setting receiving part 220 receives the setting of the evaluation object (evaluation range) when each evaluation lighting pattern xi is evaluated. When a plurality of evaluation images R are acquired for each evaluation lighting pattern xi, the setting receiving part 220 receives the setting of the evaluation object image of the evaluation object from the plurality of evaluation images R, and receives the setting of evaluation object regions which are set as the evaluation object in the evaluation object image. When one evaluation image R is acquired for each evaluation lighting pattern xi, the setting receiving part 220 receives the setting of evaluation object regions.

The feature amount calculation part 230 calculates a feature amount from the evaluation object regions of each evaluation object image. The evaluation object image is obtained for each evaluation lighting pattern xi. Therefore, the feature amount A is obtained for each evaluation lighting pattern xi. Moreover, when a plurality of evaluation object regions are set for one evaluation lighting pattern xi, a plurality of feature amounts A are calculated for the one evaluation lighting pattern xi.

The evaluation value calculation part 240 calculates an evaluation value Pi that corresponds to the evaluation lighting pattern xi based on the calculated feature amount A. The evaluation value Pi is, for example, a value that shows what degree is the evaluation lighting pattern xi suitable for the image measurement.

The pattern determination part 250 uses a coefficient $1i$ that is determined based on the evaluation value Pi calculated by the evaluation value calculation part 240 to calculate a linear combination of the evaluation lighting patterns xi, thereby determining the lighting pattern for measurement L to be used in the image measurement. The coefficient is determined for each evaluation lighting pattern xi and is a value that shows the degree of influence of one evaluation lighting pattern xi on the lighting pattern for measurement L to be used in the image measurement.

According to the image processing system 1 of this embodiment, the evaluation lighting patterns xi are evaluated one by one to calculate the evaluation value Pi, and the coefficient $1i$ that is determined based on the evaluation value Pi is used to linearly combine each evaluation lighting pattern xi to determine the lighting pattern for measurement L. Therefore, even if all the lighting patterns implemented using a plurality of partial regions 40 are not tried, the images may be taken only under a plurality of predetermined evaluation lighting patterns xi, and the lighting setting of the illumination device 4 can be performed in a simpler manner.

§ 2 Specific Example

A. Configuration of Image Processing System

Figure 2:
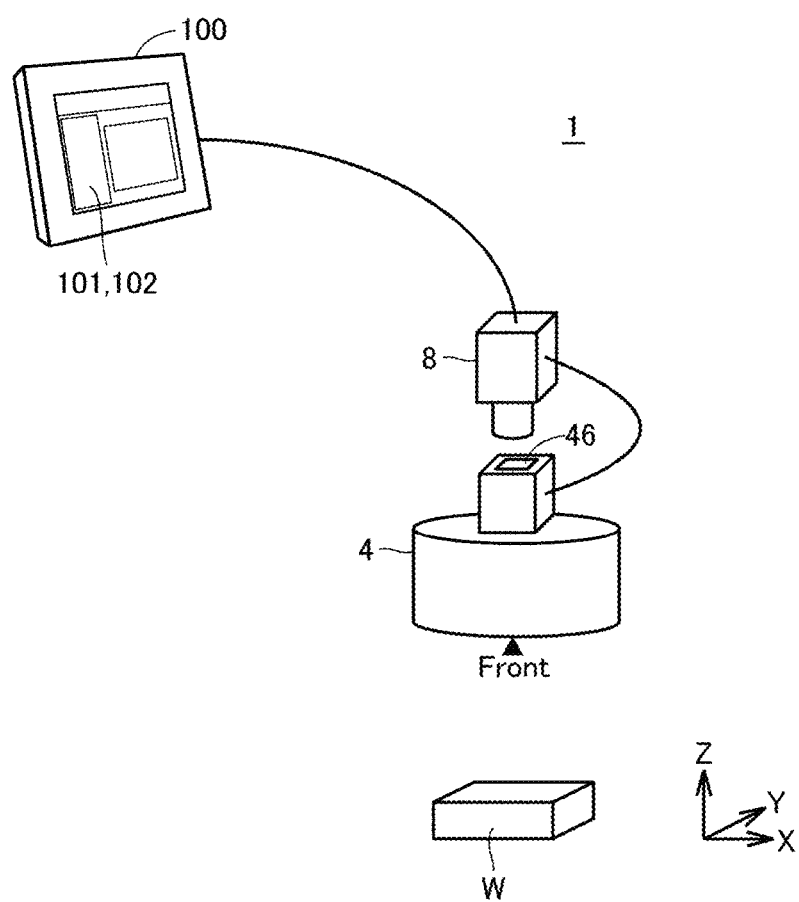
FIG. 2 is a schematic diagram showing a basic configuration of the image processing system 1.

FIG. 2 is a schematic diagram showing a basic configuration of the image processing system 1. The image processing system 1 includes the control device 100, the camera 8, and the illumination device 4 as main components. The control device 100 and the camera 8 are connected to be capable of reciprocal data communication. The illumination device 4 is controlled by the control device 100 via the camera 8.

Moreover, in the following, for the convenience of description, a direction in which light are irradiated from the illumination device 4 is defined as Z axis, the left and right direction of the paper surface is defined as X axis, and an axis perpendicular to the X axis and the Z axis is defined as Y axis. In addition, the side on which the light is irradiated is defined as the lower side. In addition, when facing the illumination device from the position recited as "Front" in FIG. 2, the right side is set as right, the left side is set as left, the front side is set as front, and the rear side is set as rear.

On the upper part of the illumination device 4, an opening part 46 is arranged in a manner that the camera 8 can image the target W from the upper part of the illumination device 4. Moreover, in this embodiment, the camera 8 is disposed on the upper part of the illumination device 4, but the camera 8 may be disposed in any manner as long as at least a portion of imaging visual field of the camera 8 includes at least a portion of irradiation region of the illumination device 4, and may be disposed on the lateral side of the illumination device 4.

The camera 8 is an imaging part that images a target existing in the imaging visual field and generates images. The camera 8 includes an optical system such as a lens or a diaphragm, and a light receiving element such as a CCD (Charge Coupled Device) image sensor or a CMOS (Complementary Metal Oxide Semiconductor) image sensor as main components.

The control device 100 can receive the setting of the content of image processing in addition to execution of image processing such as inspection of existence of defects or stains on the target W, measurement of size, arrangement or orientation of the target W, and recognition of characters, diagrams and the like on the surface of the target W. The setting of the content of image processing includes the setting of imaging conditions when images are acquired and the setting of processing content implemented to the images. The setting of the imaging conditions includes lighting setting to the illumination device 4 and camera setting to the camera 8. The control device 100 functions as a device used to perform the lighting setting to the illumination device 4. Moreover, a setting assistance device that performs the lighting setting to the illumination device 4 may be arranged independently from the control device 100.

The control device 100 includes a display part 101 and a touch panel 102 mounted on a display surface of the display part 101. Typically, the display part 101 includes a liquid crystal display and displays the setting content to the user for example. The touch panel 102 functions as an input part used to input information related to various settings. For example, the user can input setting information related to the setting of content of image processing and perform various settings by operating the touch panel 102 based on the information displayed on the display part 101. Moreover, the input part is configured of a touch panel, and may also be configured of a keyboard, a mouse, or both.

B. Configuration of Illumination Device

Figure 3:
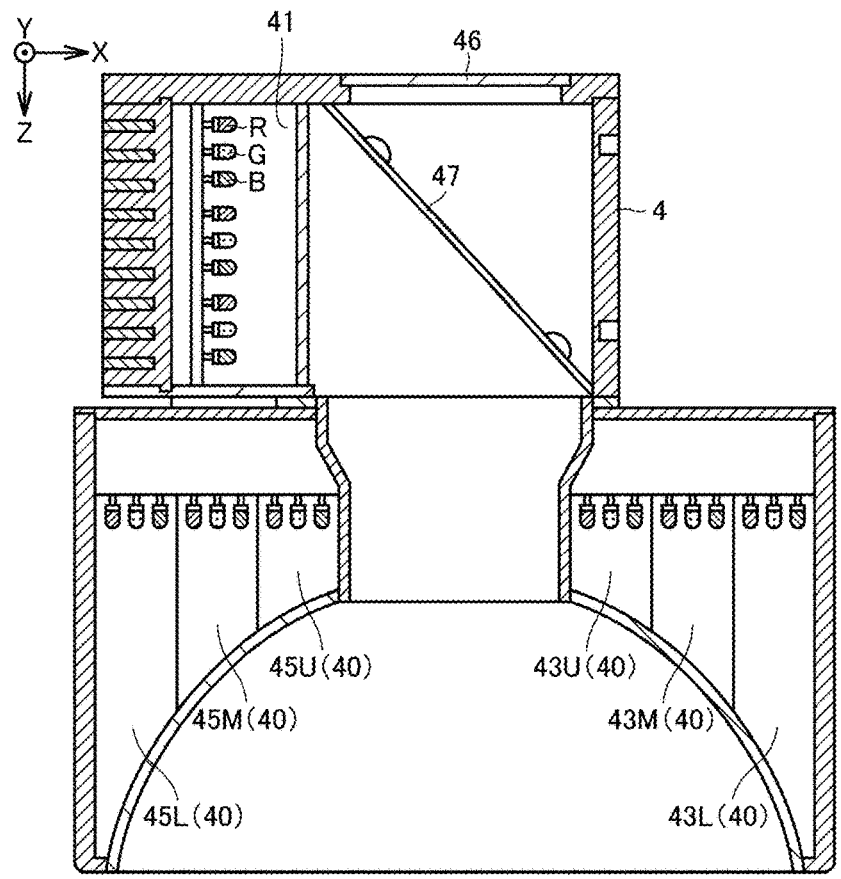
FIG. 3 is a diagram showing an XZ cross-section of an illumination device.
Figure 4:
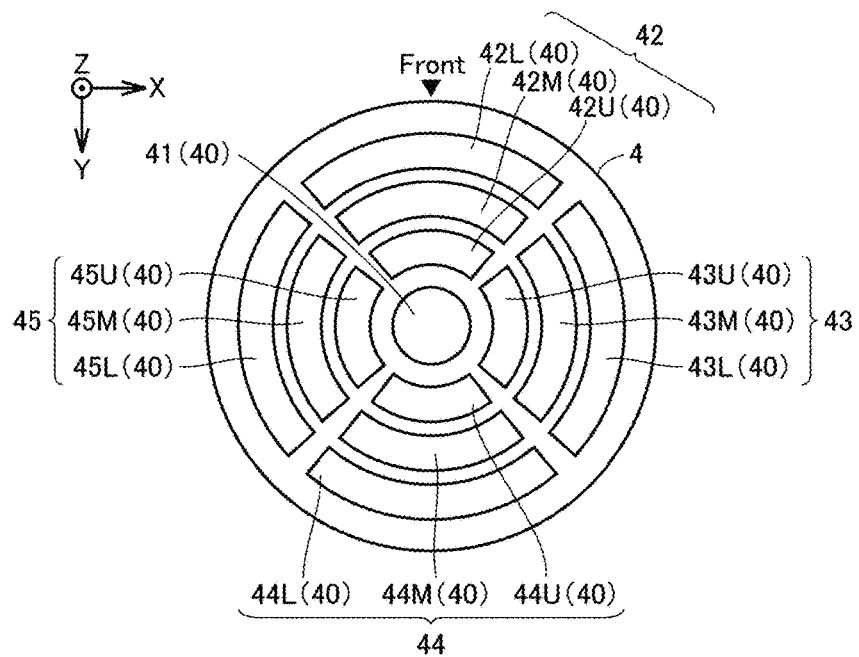
FIG. 4 is a bottom view of an illumination device.

The configuration of the illumination device 4 is described with reference to FIG. 3 and FIG. 4. FIG. 3 is a diagram showing an XZ cross-section of the illumination device 4. FIG. 4 is a bottom view of the illumination device 4.

In FIG. 3, the XZ cross-section is the one observed from the position shown as "Front" in FIG. 2. As shown in FIG. 3, illumination of the illumination device 4 is dome-like. In the illumination device 4, plural sets of a plurality kinds of light-emitting parts (hereinafter also referred to as "light source") having different main wavelengths are disposed in positions opposing the target W. Specifically, plural sets of light source configured of a red light source r, a green light source g, and a blue light source b are disposed. Moreover, in FIG. 3, the light sources hatched by oblique lines slantingly to the lower left are the red light source r, the light sources attached with dotted pattern are the green light source g, and the light sources hatched by oblique lines slantingly to the lower right are the blue light source b. Some of the symbols are omitted.

The plurality of light sources are divided into a plurality of regions. Specifically, as to lighting region of each set of the plurality of light sources disposed on the illumination device 4, a central circular central region 41 (hereinafter also referred to as "circular region"), and arc-shaped front region 42, right region 43, rear region 44, and left region 45 arranged on an outer periphery centered on the central region 41 are set.

The light irradiated from each region of the central region 41, the front region 42, the right region 43, the rear region 44, and the left region 45 have different incident azimuths. The incident azimuth is an azimuth centered on the Z axis. Besides, the front region 42, the right region 43, the rear region 44 and the left region 45 as a whole form a ring centered on the central region 41. In this embodiment, the annular regions centered on the central region 41 are divided into four regions, and may also be divided into more than four regions or three or less regions. Moreover, the light irradiated from the central region 41 turns downward due to the reflection at a reflection plate 47.

In addition, a plurality of annular regions (hereinafter also referred to as "annular region") centered on the circular central region 41 and having different diameters is set for each set of lighting regions of the plurality of light source. Specifically, an upper region, a middle region, and a lower region are set. The upper region, the middle region, and the lower region respectively comprise a plurality of arc-shaped regions. For example, the upper region comprises a front region upper part 42U, a right region upper part 43U, a rear region upper part 44U and a left region upper part 45U. Similarly, the middle region comprises a front region middle part 42C, a right region middle part 43C, a rear region middle part 44C and a left region middle part 45C, and the lower region comprises a front region lower part 42L, a right region lower part 43L, a rear region lower part 44L and a left region lower part 45L. As for the light irradiated from each annular region having different diameters, incident angles of the light incident on each XY plane are different. Moreover, three annular regions are set, but there may also be more than three annular regions or may be two annular regions.

The plurality of light sources disposed on the illumination device 4 of this embodiment is divided into 13 regions. In the following, each of the 13 divided regions is also referred to as a partial region. The partial region corresponds to the "illumination element" of the disclosure. The illumination device 4 can adjust the light emitting state of the light source for each partial region arranged on the illumination device 4. Here, the light emitting state of the light source includes not only the light emission intensity of the light source but also the color or intensity of the light irradiated from the region.

Because the red light source r, the green light source g, and the blue light source b are arranged on each partial region arranged on the illumination device 4 of this embodiment, the colors of the irradiated light can be changed for each partial region. Moreover, the wavelength bands of the main wavelength of the light irradiated from the red light source r, the main wavelength of the light irradiated from the green light source g, and the main wavelength of the light irradiated from the blue light source b are different from each other. Therefore, the illumination device 4 is configured to be capable of selectively irradiating light having mutually different main wavelengths.

Moreover, there is no need that the same number of the red light source r, the green light source g, and the blue light source b are disposed in each region, but three kinds of light sources may be disposed one by one or more. In addition, the ratio of the red light source r, the green light source g, and the blue light source b included in each region may be the same or may be different. For example, there may be more red light sources r disposed in one region than other light sources, while there are less red light sources r disposed in other regions than other light sources. In this embodiment, the example in which the same number of the red light source r, the green light source g, and blue light source are disposed is described.

C. Hardware Configuration of Control Device 100

Figure 5:
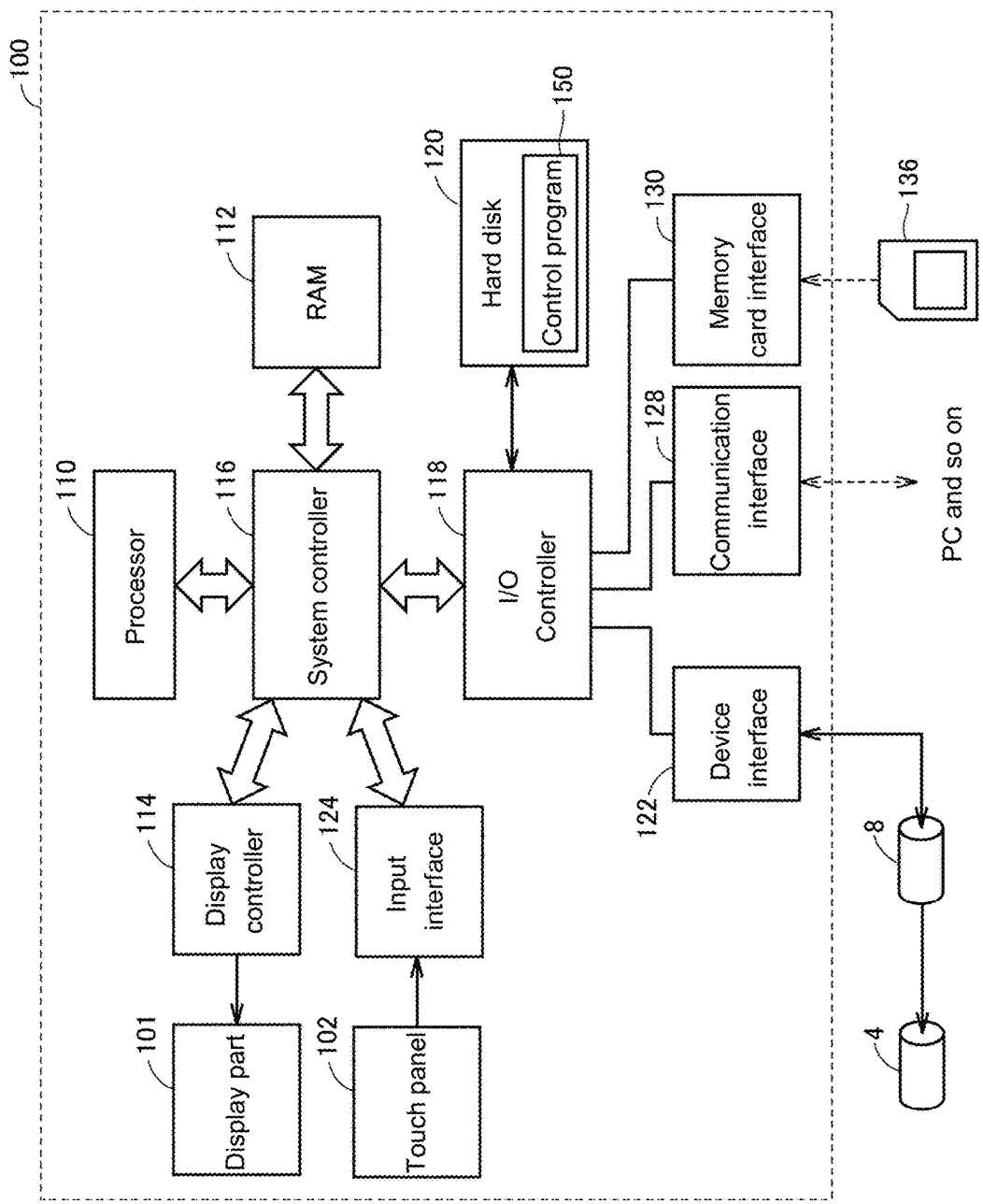
FIG. 5 is a schematic diagram showing a hardware configuration of a control device.

FIG. 5 is a schematic diagram showing a hardware configuration of the control device 100. As shown in FIG. 5, the control device 100 typically has a structure in accordance with versatile computer architecture, and realizes various processing as mentioned later by a processor executing programs installed in advance.

More specifically, the control device 100 includes a processor 110 such as a CPU (Central Processing Unit) or a MPU (Micro-Processing Unit), a RAM (Random Access Memory) 112, a display controller 114, a system controller 116, an I/O (Input Output) controller 118, a hard disk 120, a device interface 122, an input interface 124, a communication interface 128, and a memory card interface 130. Each of these elements is centered on the system controller 116 and connected to each other so as to enable data communication.

The processor 110 exchanges programs (codes) and the like with the system controller 116 and executes these programs (codes) in a predetermined sequence, thereby realizing target arithmetic processing.

The system controller 116 is connected respectively to the processor 110, the RAM 112, the display controller 114, the input interface 124 and the I/O controller 118 via a bus, performs data exchange and the like with each of the above elements and controls the processing of the entire control device 100.

Typically, the RAM 112 is a volatile memory device such as a DRAM (Dynamic Random Access Memory), and stores work data and the like including programs read out from the hard disk 120, or camera images acquired by the camera 8, processing results of the images, and imaging conditions.

The display controller 114 is connected to the display part 101 and outputs signals used for displaying various information to the display part 101 in accordance with internal commands from the system controller 116.

The input interface 124 is connected to the touch panel 102 and transmits various information input from the touch panel 102 to the system controller 116.

The I/O controller 118 controls data exchange with recording mediums or external machines connected to the control device 100. More specifically, the I/O controller 118 is connected to the hard disk 120, the device interface 122, the communication interface 128, and the memory card interface 130.

Typically, the hard disk 120 is a nonvolatile magnetic memory device, in which various setting values and so on are stored in addition to a control program 150 such as an algorithm and the like that is executed by the processor 110. The control program 150 installed in the hard disk 120 is distributed in a state of being stored in a memory card 136 and the like. Moreover, a semiconductor memory device such as a flash memory or an optical memory device such as such as a DVD-RAM (Digital Versatile Disk Random Access Memory) may be adopted instead of the hard disk 120.

The device interface 122 mediates the data transmission of the camera 8 and the illumination device 4 with the processor 110. The device interface 122 outputs instructions in accordance with commanded imaging conditions from the processor 110 to the camera 8 and the illumination device 4 via the device interface 122. In addition, the device interface 122 acquires image data obtained by imaging the target W and mediates the data transmission between the processor 110 and the camera 8.

The communication interface 128 mediates the data transmission between the processor 110 and another unillustrated personal computer, server device or the like. Typically, the communication interface 128 comprises an Ethernet (registered trademark), a USB (Universal Serial Bus) or the like.

The memory card interface 130 mediates the data transmission between the processor 110 and the memory card 136 serving as a recording medium. In the memory card 136, the control program 150 and the like executed by the control device 100 are distributed in a state of being stored, and the memory card interface 130 reads out the control program 150 from the memory card 136. The memory card 136 includes a versatile semiconductor memory device such as SD (Secure Digital), a magnetic recording medium such as a flexible disk, an optical recording medium such as a CD-ROM (Compact Disk Read Only Memory), or the like. Elsewise, programs download from a distribution server and the like may be installed in the control device 100 via the communication interface 128.

When the computer having the structure in accordance with the aforementioned versatile computer architecture is used, in addition to applications used to provide the functions of this embodiment, an OS (Operating System) used to provide basic functions of a computer may also be installed. In this case, the control program of this embodiment may be a control program that calls necessary modules among the program modules provided as a portion of the OS in a predetermined sequence and/or timing and executes processing.

Furthermore, the control program of this embodiment may be provided as a control program that is incorporated into a portion of another program. In this case, the program itself does not include the modules included in the aforementioned combined program, and cooperates with these programs to execute the processing. That is, the control program of this embodiment may be incorporated into such another program.

Moreover, alternatively, a portion or all of the functions provided by execution of the control program may be implemented as a dedicated hardware circuit.

D. Summary of Determination Method of Lighting Pattern

In this embodiment, the control device 100 images under mutually different evaluation lighting patterns, acquires evaluation images R, evaluates evaluation lighting patterns based on the evaluation images R and determines the lighting pattern for measurement L to be used in the image measurement based on the evaluation result.

Figure 6:
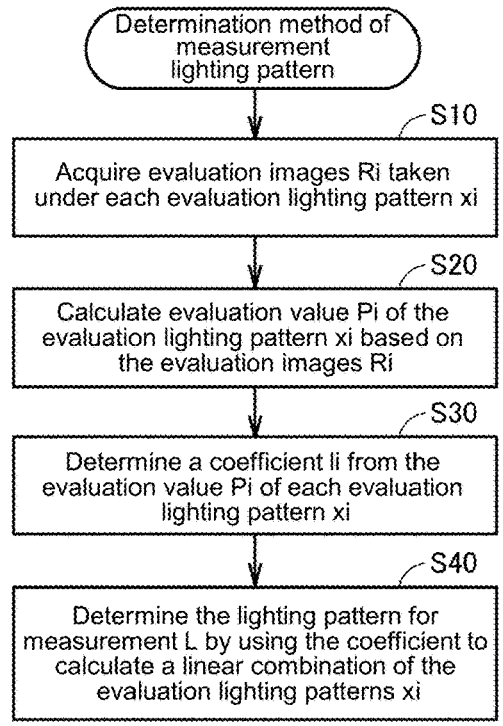
FIG. 6 is a diagram showing a flow of determining a lighting pattern for measurement.

FIG. 6 is a diagram showing the flow of determining the lighting pattern for measurement L. The control device 100 acquires evaluation images Ri taken under each evaluation lighting pattern xi (S10), and calculates the evaluation value Pi of the evaluation lighting pattern xi based on the acquired evaluation images Ri (S20). The control device 100 determines a coefficient $1i$ from the obtained evaluation value Pi of each evaluation lighting pattern xi (S30), and uses the coefficient to calculate the linear combination of the evaluation lighting patterns xi, thereby determining the lighting pattern for measurement L (S40).

In this embodiment, the evaluation value P of the lighting pattern for measurement L is substantially equal to the result obtained by linearly combining the evaluation values Pi of the evaluation lighting patterns xi using the coefficients $1i$.

Therefore, the coefficients $1i$ are obtained by fitting the coefficients $1i$ in a manner that the coefficients $1i$ become greatest when linearly combining the evaluation values Pi of the evaluation lighting patterns xi.

In this embodiment, the evaluation value Pi is calculated as a value that shows what degree the difference between the feature amount of the feature region desired to be measured in the image measurement and the feature amount of the regions other than the feature region contributes. The "feature region to be specified" is, for example, a region in which the feature amount is to be extracted, for example, a region in which scratches are located. On the other hand, the "regions other than the feature region" are, for example, regions in which the feature amount is not to be extracted, such as regions in which scratches are not located.

By using the evaluation value Pi obtained in this manner, the control device 100 can determine the lighting pattern under which the difference between the feature amount of the feature region to be specified and the feature amount of the regions other than the feature region increases to be the lighting pattern for measurement L. By performing image measurement using the images obtained under such a lighting pattern for measurement L, the feature amount to be extracted as an inspection can be accurately extracted.

In this embodiment, by solving mathematical optimization problems shown in the following equation (1), the coefficient $1i$ can be determined and the lighting pattern for measurement L can be determined.

[Equation 1]

Maximization: $|\Sigma_{i=0}^{i=n}((\alpha_{h2i}-\alpha_{h1i})b_i l_i)|$

Constraint condition: $\Sigma_{i=0}^{i=n}(\alpha_{h1i}b_i l_i) \leq 255$, and
$\Sigma_{i=0}^{i=n}(\alpha_{h2i}b_i l_i) \leq 255$ Variable: $l_i \in \{0,1\}$ (1)

Here, the subscript i is a subscript showing the type of the evaluation lighting pattern xi. The subscript h2 is a subscript showing the feature region. The subscript h1 is a subscript showing the regions other than the feature region. The coefficient αi is a coefficient that shows to what degree does the evaluation lighting pattern xi influence the feature amount A obtained from the predetermined region. The light quantity bi is the light quantity of the illumination light when illumination light is irradiated from the illumination device 4 according to the evaluation lighting pattern xi.

E. Method for Deriving Mathematical Optimization Problems

A method for deriving the mathematical optimization problems as shown in equation (1) is described. The image processing system 1 of this embodiment determines the lighting pattern under which the difference between the feature amount of the feature region to be specified in image measurement and the feature amount of the regions other than the feature region increases to be the lighting pattern for measurement L. That is, if an evaluation function f to calculate the feature amount is represented by illumination parameters defining the lighting pattern of the illumination device 4, it is represented by equation (2). Moreover, the illumination parameters refer to variables showing illumination color, luminance of illumination, and location of illumination.

[Equation 2]

$f(x_0, x_1, \ldots, x_n)$ (2)

Here, xi means one evaluation lighting pattern and is defined by the location, luminance and color of the lighting under this evaluation lighting pattern xi.

Here, increasing the difference between the feature amount of the feature region h1 and the feature amount of the non-feature region h2 other than the feature region becomes the problem of calculating the illumination parameters (the lighting pattern) that maximize equation (3).

[Equation 3]

$|f_{h2}(x_0, x_1, \ldots x_n) - f_{h1}(x_0, x_i, \ldots, x_n)|$ (3)

In addition, the evaluation function f can be approximated to a function having the linearity as mentioned below by the coefficient α showing the degree of influence exerted by each evaluation lighting pattern to the evaluation result.

[Equation 4]

$f_{h1}(x_0, x_1, \ldots x_n) \approx \Sigma_{i=0}^{n}(\alpha_{h1i} x_i)$ (4)

Because the evaluation function f can be approximated as shown by equation (4), equation (3) can be approximated as shown by equation (5).

[Equation 5]

$|f_{h2}(x_0, x_1, \ldots, x_n) - f_{h1}(x_0, x_1, \ldots x_n)| \approx |\Sigma_{i=0}^{n}(\alpha_{h2i} x_i) - \Sigma_{i=0}^{n}(\alpha_{h1i} x_i)| = |\Sigma_{i=0}^{n}((\alpha_{h2i}-\alpha_{h1i})x_i)|$ (5)

When it is assumed that the light quantity b of the light irradiated from the evaluation lighting pattern x does not change, that is, when it is assumed to be an ON state or an OFF state only, x can be approximated as shown by equation (6).

[Equation 6]

$x_i \approx b_i l_i$ (6)

Equation (1) is obtained by substituting equation (6) into equation (5). Moreover, in this embodiment, each evaluation lighting pattern xi is described as the pattern that light one type of light source included in one partial region. Therefore, the coefficient 1i which is a variable is either 0 or 1, and there are 39 kinds (13 regions×3 kinds of light sources) of evaluation lighting patterns. Accordingly, n is 38. In addition, the constraint conditions are determined corresponding to the evaluation function f. In this embodiment, the evaluation function is described as a function related to brightness values, such as a function related to color average of the predetermined region in the image.

Here, the $(\alpha h2i - \alpha h1i) \times bi$ obtained for each evaluation lighting pattern xi corresponds to the evaluation value Pi of the evaluation lighting pattern xi.

F. Acquisition of Evaluation Image Ri

In this embodiment, the control device 100 changes the evaluation lighting pattern xi by the illumination device 4 lighting the partial regions one by one in sequence and changing in sequence the colors of the light irradiated from each partial region. For example, after lighting the red light source r, the green light source g and the blue light source b contained in the front region lower part 42L in sequence, the illumination device 4 lights the red light source r, the green light source g and the blue light source b contained in the front region middle part 42C in sequence. In this way, for each of the 13 divided partial regions 40, three kinds of light sources contained in each partial region 40 are lighted separately. The camera 8 images in the imaging visual field under each evaluation lighting pattern xi and generates evaluation images Ri. The control device 100 acquires the evaluation images Ri from the camera 8.

In this embodiment, in the illumination device 4, 13 partial regions are set, and three kinds of light source are arranged in each partial region, and thus for the evaluation lighting pattern xi, 39 patterns (=13 regions×3 colors of light sources) are set. In addition, the evaluation images Ri are obtained for each of the 39 patterns of the evaluation lighting pattern xi. Moreover, the subscript i of the evaluation images Ri represents the evaluation lighting pattern xi, and the evaluation images Ri mean the images taken under the evaluation lighting pattern xi.

The control device 100 acquires at least more than one evaluation image Ri for each evaluation lighting pattern xi. Moreover, in this embodiment, the situation in which one evaluation image Ri is acquired for one evaluation lighting pattern xi is described. The control device 100 associates the evaluation image Ri with the evaluation lighting pattern xi and stores in the RAM 112 and the like. Moreover, the destination to store the evaluation image Ri may also be the hard disk 120 or a server and the like communicably connected to the control device 100.

G. Calculation of Evaluation Value Pi

The evaluation value Pi is a value that shows the magnitude of the difference between the feature amount of the feature region h1 in the evaluation image Ri and the feature amount of the non-feature region h2 other than the feature region. The evaluation value Pi is obtained, for example, by calculating the difference between feature amount A1 of an attention region H1 containing the feature region h1 and feature amount A2 of a non-attention region H2 except the attention region H1. Besides, the evaluation value Pi may be variation amount of the feature amount within the attention region H1.

The attention region H1 is a region prescribed in advance and is prescribed by the user for example. Specifically, the user specifies the feature region h1 while observing the image of the target W displayed in the display part* connected to the control device 100, and prescribes a region so as to contain the feature region.

The feature amount A includes, for example, at least one of contrast, color average, deviation, and edge amount. Whether to use the difference between the feature amount A1 of the attention region H1 and the feature amount A2 of the non-attention region H2 or the variation amount of the feature amount A within the attention region H1 as the evaluation value Pi may be determined in advance or be selected by the user.

The control device 100 calculates the evaluation value Pi for each evaluation image Ri. Because the evaluation image Ri is obtained for each evaluation lighting pattern xi, the evaluation value Pi is also obtained for each evaluation lighting pattern xi. The control device 100 associates the calculated evaluation value Pi with the evaluation lighting pattern xi and stores the same in the RAM 112 and the like. Moreover, the destination to store the evaluation value Pi may also be the hard disk 120 or the server 5 and the like communicably connected to the control device 100.

Figure 7:
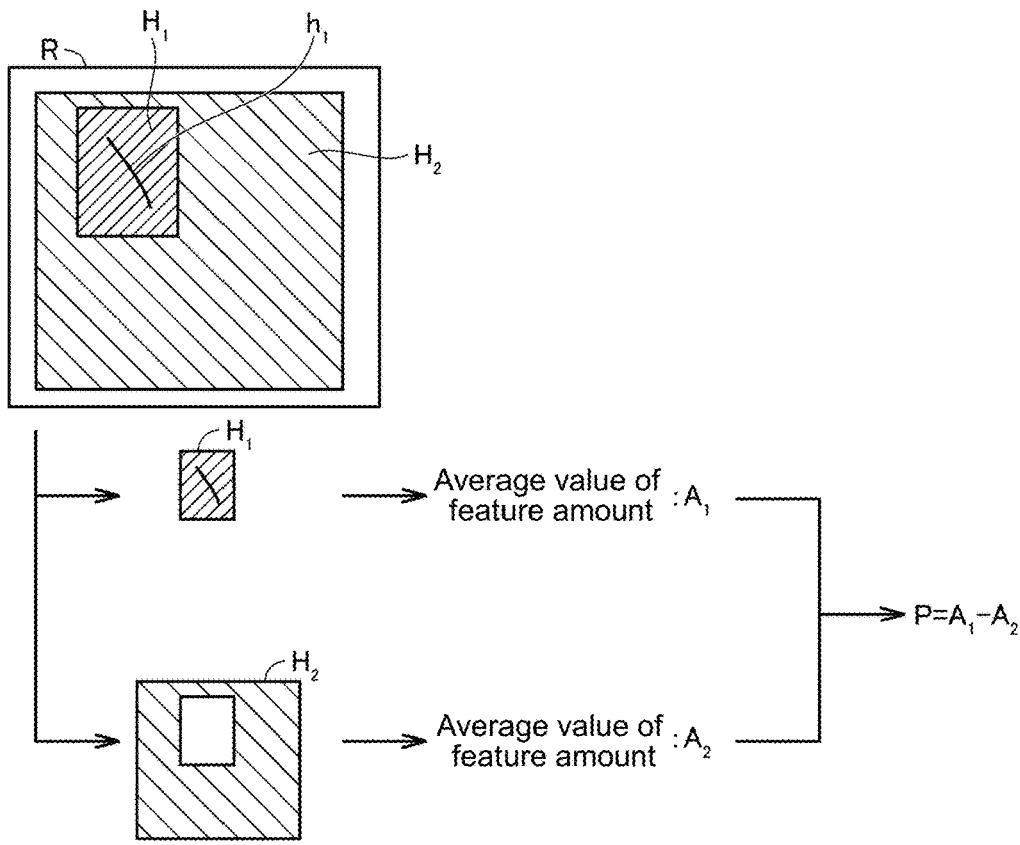
FIG. 7 is a diagram showing an example in which difference between feature amount of an attention region and feature amount of a non-attention region is set as evaluation values.
Figure 8:
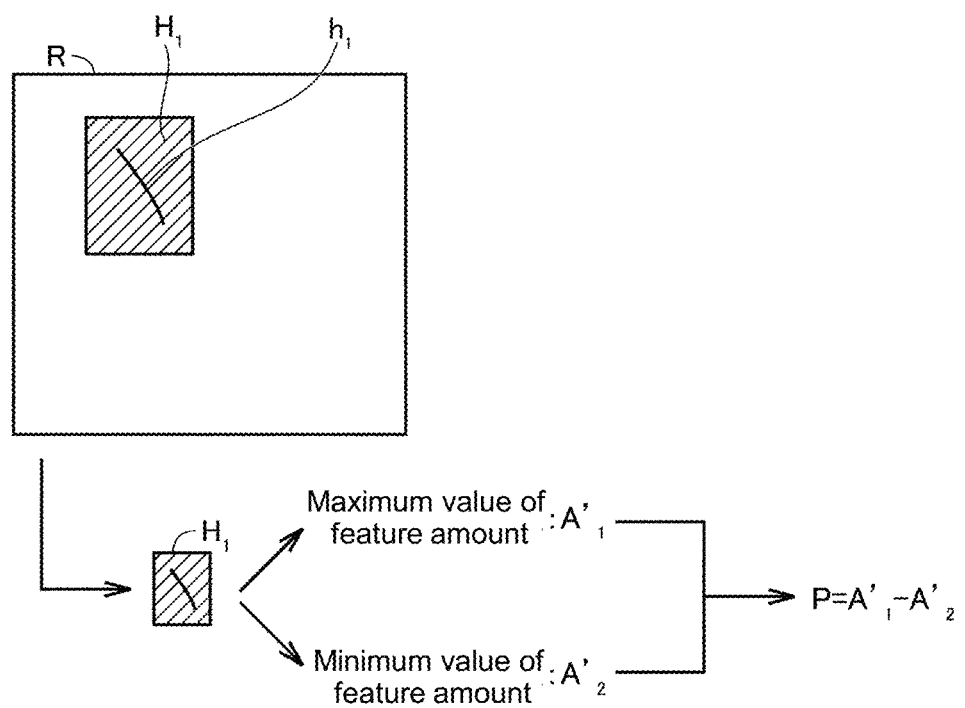
FIG. 8 is a diagram showing an example in which variation amount of feature amount in an attention region is set as evaluation values.

FIG. 7 is a diagram sho+wing an example in which the difference between the feature amount A1 of the attention region H1 and the feature amount A2 of the non-attention region H2 are set as the evaluation value P. FIG. 8 is a diagram showing an example in which the variation amount of the feature amount within the attention region H1 is set as the evaluation value P.

As shown in FIG. 7, the evaluation value P is the difference between the feature amount A1 within the attention region H1 and the feature amount A2 of the non-attention region H2. The attention region H1 contains the region h1 having a scratch which is a feature region. On the other hand, the non-attention region H2 does not contain the region h1.

Moreover, because the attention region H1 and the non-attention region H2 do not necessarily have the same area, the feature amount A1 of the attention region H1 and the feature amount A2 of the non-attention region H2 are preferably standardized values. In FIG. 7, the non-attention region H2 is also defined, and the non-attention region H2 may be a region in the evaluation image R except the attention region H1.

In the example shown in FIG. 7, the evaluation image R is one example of the "evaluation object image", and the attention region H1 and the non-attention region H2 are one example of the "evaluation object region".

As shown in FIG. 8, as for the evaluation value P, when the maximum value of the feature amount within the attention region H1 is set as feature amount A'1 and the minimum value of the feature amount within the attention region H1 is set as feature amount A'2, the difference between the feature amount A'1 and the feature amount A'2 may be set as the evaluation value P. Moreover, even when the maximum value and the minimum value are not calculated, the deviation of the feature amount within the attention region H1 may be set as the evaluation value P.

In the example shown in FIG. 8, the evaluation image R is one example of the "evaluation object image", and the attention region H1 is one example of the "evaluation object region".

H. Determination of Coefficient 1i

The control device 100 solves the mathematical optimization problems of equation (1) from the evaluation value Pi to determine the coefficient 1i. The mathematical optimization problems fit the coefficient 1 in a manner that the value of equation (7) reaches a maximum value. The fitting method can be an existing method, all combinations may be performed or existing searching method may be used.

[Equation 7]

$$|\Sigma_{i=0}^{38}((\alpha_{h2_i} - \alpha_{h1_i})b_i l_i)| = |\Sigma_{i=0}^{38}(P_i l_i)| \quad (7)$$

Here, when solving the mathematical optimization problems, constraint condition is determined as a range in which the evaluation function $f$ can be approximated to a function such as equation (4) which has linearity. The constraint condition is determined according to the evaluation function $f$, that is, the evaluation value Pi. For example, the constraint condition of equation (1) is the constraint condition of a case in which the evaluation value Pi is set to a value corresponding to a pixel value.

I. Determination of Lighting Pattern for Measurement

The control device 100 determines the lighting pattern for measurement L based on the obtained coefficient 1i. The control device 100 can, as shown in equation (8), calculate the lighting pattern for measurement L by the linear combination of the evaluation lighting pattern xi that uses the coefficient 1i as the coefficient of the evaluation lighting pattern xi.

[Equation 8]

$$L = \sum_{i=0}^{38} l_i \times x_i = l_0 \begin{bmatrix} b_0 \\ 0 \\ \vdots \\ 0 \\ 0 \end{bmatrix} + l_1 \begin{bmatrix} 0 \\ b_1 \\ \vdots \\ 0 \\ 0 \end{bmatrix} \ldots + l_{37} \begin{bmatrix} 0 \\ 0 \\ \vdots \\ b_{37} \\ 0 \end{bmatrix} + l_{38} \begin{bmatrix} 0 \\ 0 \\ \vdots \\ 0 \\ b_{38} \end{bmatrix} = \begin{bmatrix} l_0 b_0 \\ l_1 b_1 \\ \vdots \\ l_{37} b_{37} \\ l_{38} b_{38} \end{bmatrix} \quad (8)$$

Moreover, in this embodiment, one evaluation lighting pattern xi lights one kind of light source contained in the partial region. Therefore, each evaluation lighting pattern xi can be defined by a determinant as shown in equation (8).

J. User Interface for Determining Lighting Pattern for Inspection

Figure 9:
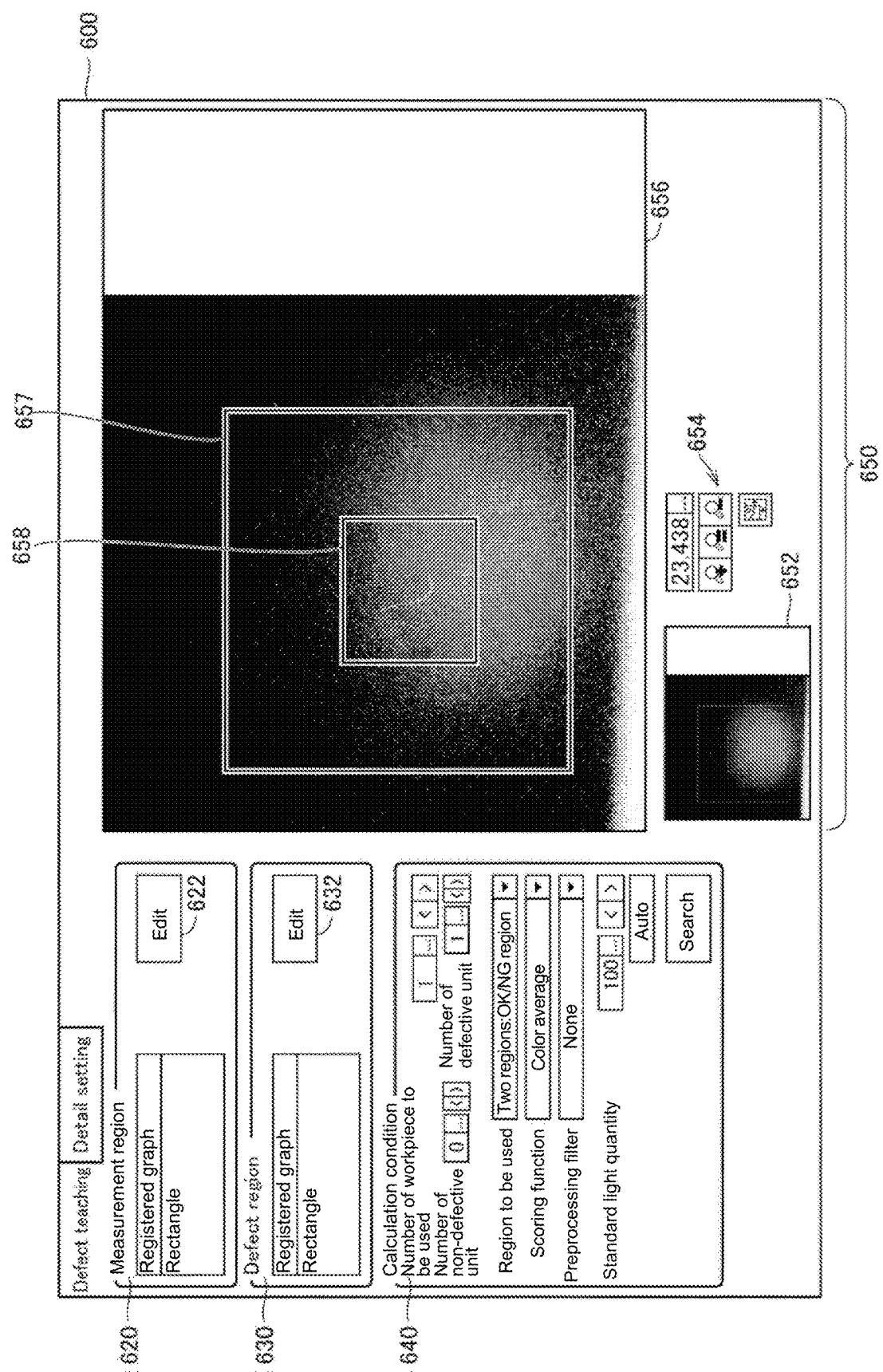
FIG. 9 is a user interface screen used to set information necessary for calculation of evaluation values.
Figure 10:
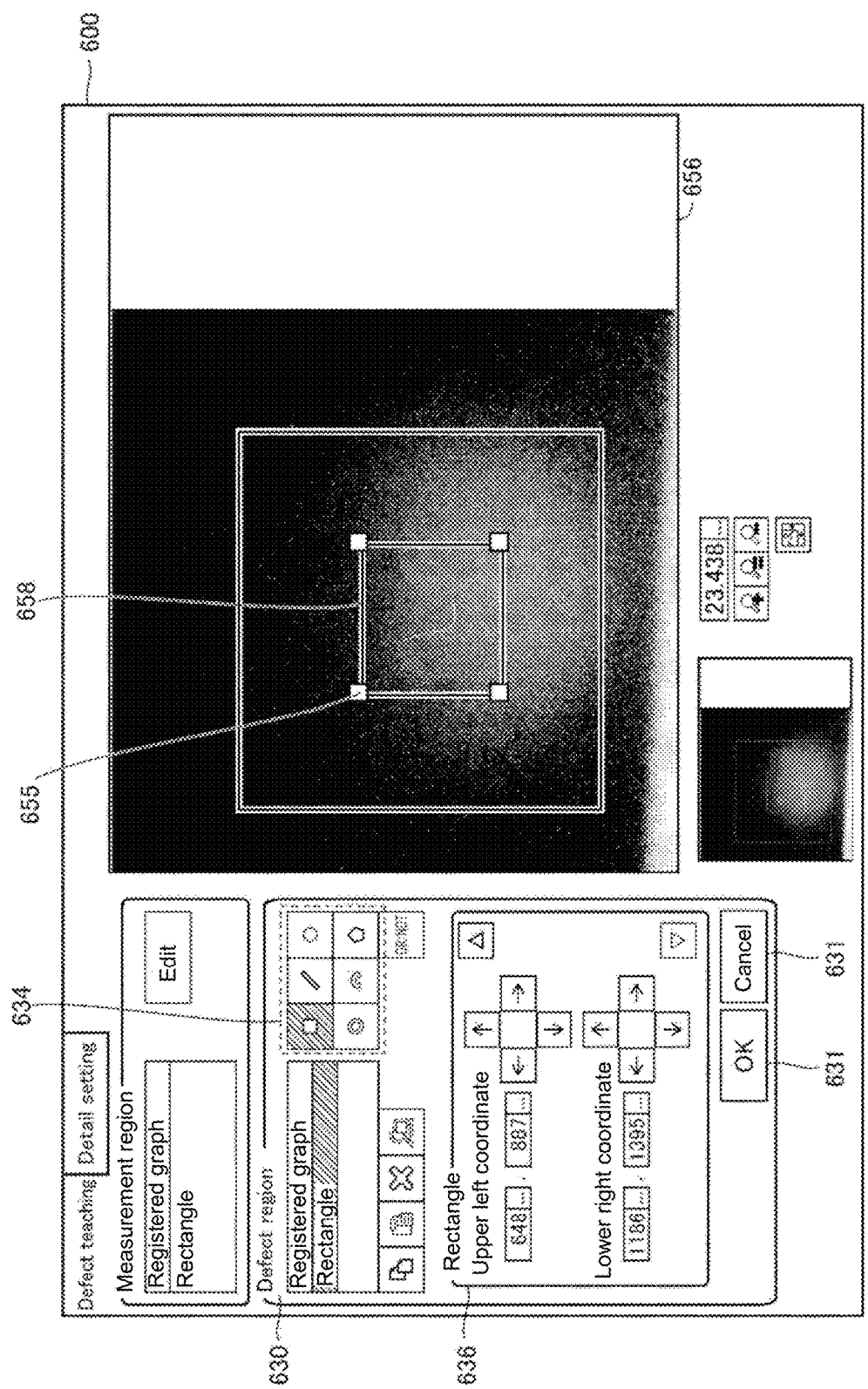
FIG. 10 is a user interface screen used to set information necessary for calculation of evaluation values.
Figure 11:
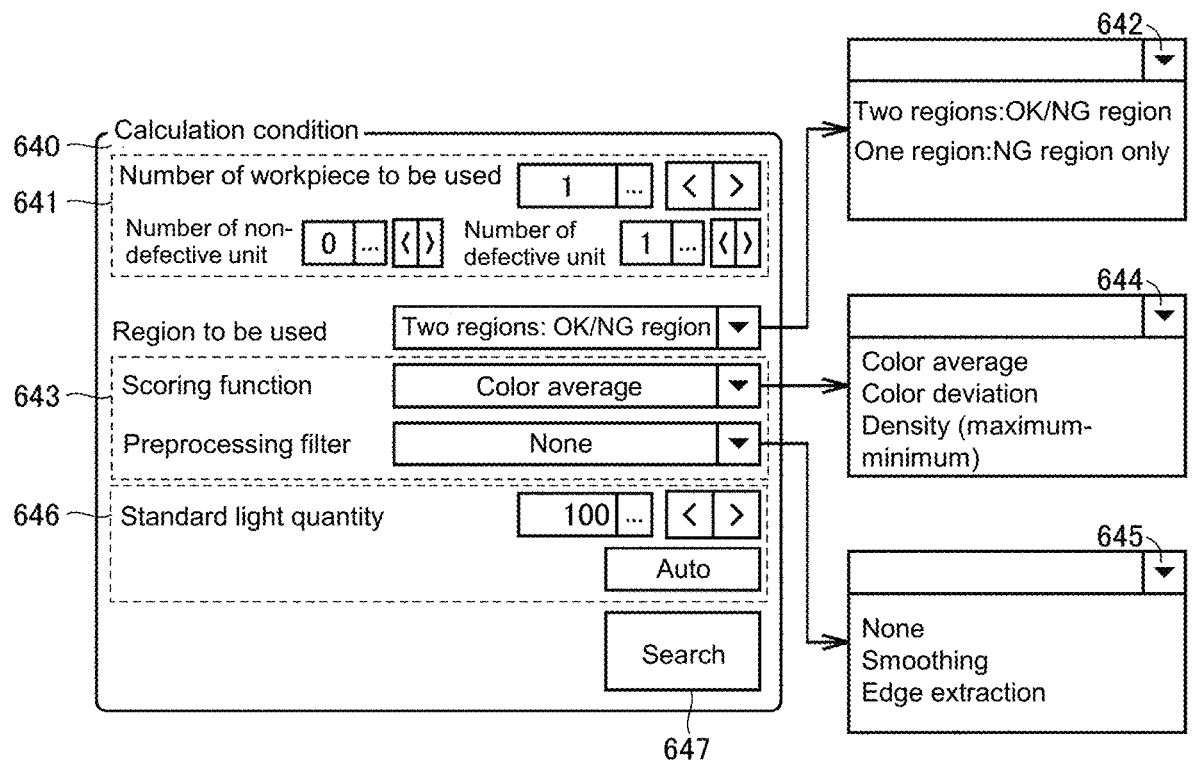
FIG. 11 is a diagram showing a calculation condition specifying region.
Figure 12:
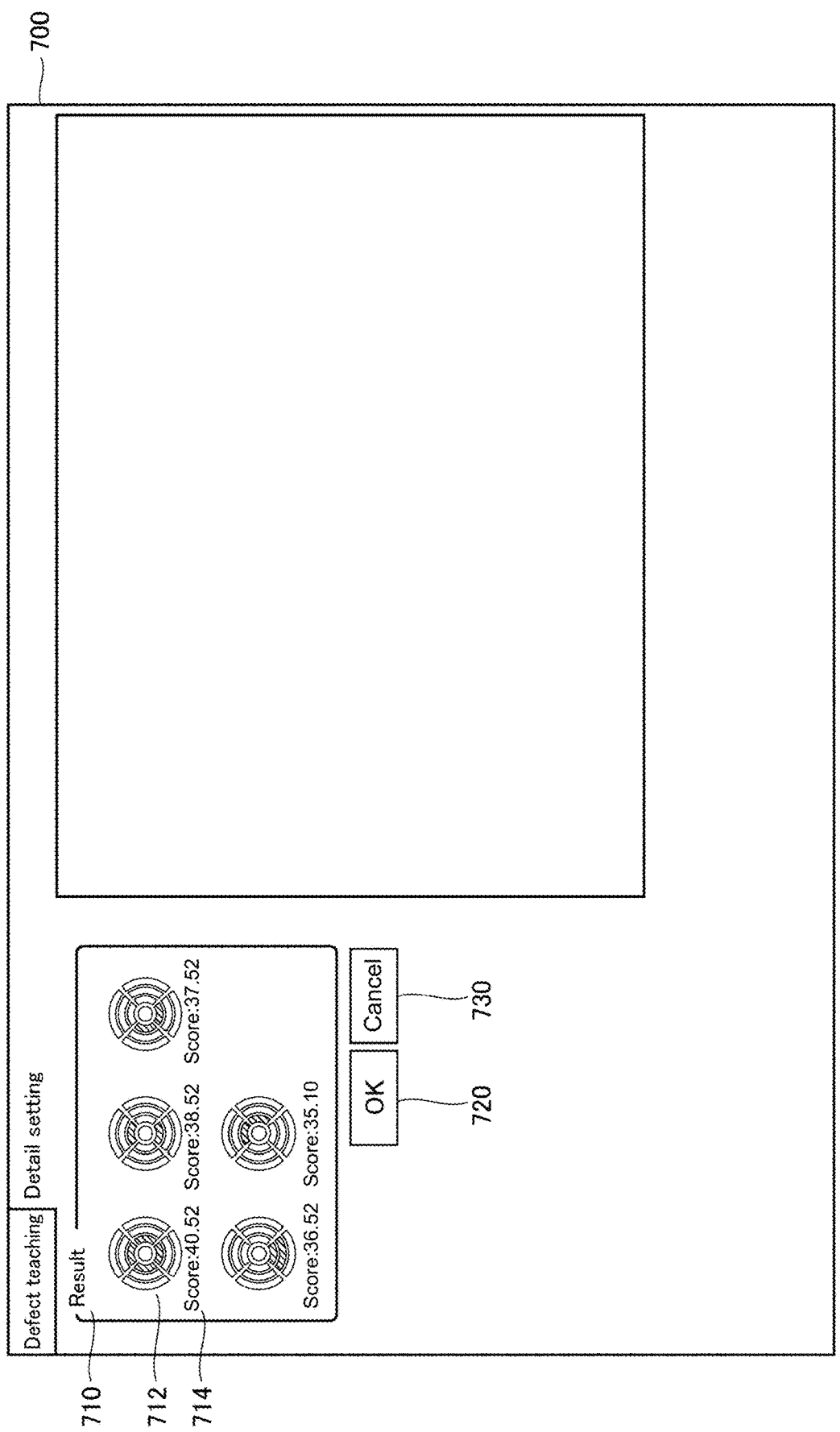
FIG. 12 is a user interface screen used to select a lighting pattern for measurement.

FIG. 9 and FIG. 10 show a user interface screen 600 which is used to set information required for the calculation of the evaluation value P. FIG. 11 is a diagram showing a calculation condition specifying region 640. FIG. 12 is a user interface screen 700 used to select the lighting pattern for measurement L. FIG. 13 is a user interface screen when one lighting pattern is selected.

As shown in FIG. 9, the user interface screen 600 includes a first range specifying region 620, a second range specifying region 630, a calculation condition specifying region 640, and an image display region 650.

Both the first range specifying region 620 and the second range specifying region 630 are regions used to specify the evaluation range in the evaluation image R. The second range specifying region 630 is a region used to specify the attention region H1. The first range specifying region is a region used to specify the non-attention region H2. When an edit button 622 of the first range specifying region 620 is operated, the non-attention region H2 can be edited. When an edit button 632 of the second range specifying region 630 is operated, the attention region H1 can be edited.

The calculation condition specifying region 640 is a region used to determine the condition for calculating the evaluation value Pi.

The image display region 650 displays the images acquired from the camera 8. The image display region 650 includes an entire display region 652, a display control icon group 654, and an enlarged display region 656. The entire display region 652 and the enlarged display region 656 display the images acquired from the camera 8. The enlarged display region 656 is wider than the entire display region 652 and displays an enlarged image of the image displayed in the entire display region 652. Moreover, the image displayed in the enlarged display region 656 may be an enlarged image of a portion of the image displayed in the entire display region 652. The display range and magnification of the image displayed in the enlarged display region 656 is changed according to the user operation (enlarging, diminishing or the like) to the display control icon group 654. The enlarged display region 656 includes an evaluation range frame 657 that shows the range to be evaluated and an attention region frame 658 that shows the range of the attention region H1.

When the edit button 632 of the second range specifying region 630 is selected, the display is switched to the one that is shown in FIG. 10 and used to edit or set the attention region H1. As shown in FIG. 10, the second range specifying region 630 includes a region shape selection button group 634 and a shape size selection region 636. The user can select a desired shape (for example, quadrangle, circle, fan-shape and so on) as the attention region H1 by selecting the desired button contained in the region shape selection button group 634. The user can set the attention region H1 to a desired size and position by the operation to the buttons and/or input boxes contained in the shape size selection region 636.

Moreover, regarding the setting of the attention region H1, the control device 100 may receive the setting by the operation on the image instead of depending on the operation to the buttons and/or input boxes contained in the shape size selection region 636. Specifically, on receiving the operation to the edit button 632, the control device 100 displays in the enlarged display region 656 a change button 655 that is used to change the position or size of the attention region frame 658 showing the attention region H1, and receives the operation to the change button 655.

When an OK button 631 is operated, the range surrounded by the attention region frame 658 displayed in the enlarged display region 656 is set as the attention region H1. On the other hand, when a cancel button 633 is operated, the information being edited is deleted.

Moreover, similar to the case in which the edit button 632 is operated, in a case that the edit button 622 of the first range specifying region 620 is operated, the region shape selection button group 634, the shape size selection region 636, the change button 655 and so on are also displayed.

When setting the calculation condition of the evaluation value, the control device 100 receives the specifying of the image of the evaluation object and the specifying of the region of the evaluation object in the specified image. The image of the evaluation object is specified. The region of the evaluation object is specified by operating various buttons contained in the first range specifying region 620 and the second range specifying region 630.

The calculation condition specifying region 640 is described with reference to FIG. 11. As shown in FIG. 11, the calculation condition specifying region 640 includes an object workpiece specifying region 641 and a use region selection tab 642.

The image used in the calculation of evaluation value is selected by the operation to the buttons contained in the object workpiece specifying region 641. In other words, the evaluation image set as the evaluation object is selected. Besides, by the operation to the buttons contained in the object workpiece specifying region 641, the user can set the image that is in the selected image and does not contain the feature region (the number of non-defective units in the diagram) and the image that is in the selected image and contains the feature region (the number of defective units in the diagram). In other words, label information corresponding to the evaluation image set as the evaluation object is received. Besides, as shown by the expression of non-defective units/defective units in the diagram, the information showing the non-existence of defects or the information showing the existence of defects is received as the label information.

Based on the received result, the control device 100 determines whether to set the magnitude of the difference between the feature amount of the attention region H1 and the feature amount of the non-attention region H2 as the evaluation value or set the variation amount of the feature amount within the attention region H1 as the evaluation value. Specifically, the selection on whether to use two regions or use one region is made based on the operation to the region selection tab 642.

In a case that two regions are used, when a region that is "OK", i.e. without defects and a region that is "NG", i.e. having defects are used, the control device 100 determines that the magnitude of the difference between the feature amount of the attention region H1 and the feature amount of the non-attention region H2 is set as the evaluation value.

When one region is used, a region that is "NG", i.e. having defects is used, and the control device 100 determines that the variation amount of the feature amount within the attention region H1 is set as the evaluation value.

In the example shown in FIG. 10, one image is selected as the image of the evaluation object (the number of use workpiece is one), this image is an image of a defective unit (the number of defective units is one), the region of the evaluation object (in the evaluation range frame 657) and the region of the attention region H1 (the attention region frame 658) are set, and it is set that two regions are used for the evaluation.

In other words, by operating the user interface screen 600, the evaluation object image that becomes the object of evaluation and the evaluation object region that is a partial region of one image and becomes the object of evaluation are selected. Besides, by operating the user interface screen 600, the label information corresponding to the evaluation object image and the evaluation object region is further received. Besides, by operating the user interface screen 600, the information showing the non-existence of defects or the information showing the existence of defects is received as the label information. When two regions are used to perform the evaluation, the control device 100 determines that the magnitude of the difference between the feature amount of the attention region H1 and the feature amount of the non-attention region H2 is set as the evaluation value. Therefore, in other words, the evaluation value is calculated from the received label information and the feature amount obtained from the evaluation object region.

Moreover, in a case that only the object workpiece specifying region 641 and the use region selection tab 642 are operated and the region of the evaluation object and the region of the attention region H1 are not set, the user may also set the entire selected evaluation image as the evaluation object region. For example, when the image of non-defective unit and the image of defective unit are selected and two regions are specified as the use region, the magnitude of the difference between the feature amount obtained from the image of non-defective unit and the feature amount obtained from the image of defective unit is calculated.

The control device 100 receives the specifying of the calculation method of feature amount. A calculation method specifying region 643 includes a feature amount selection tab 644 used to select the type of feature amount and a preprocessing tab 645 used to select the preprocessing when calculating the feature amount. The calculation method of feature amount is determined corresponding to the operation to the feature amount selection tab 644 and the preprocessing tab 645.

The control device 100 receives the setting of standard light quantity of the evaluation lighting pattern. The calculation method specifying region 643 includes a light quantity setting region 646. The setting of standard light quantity of the evaluation lighting pattern is received corresponding to the operation to the buttons contained in the light quantity setting region 646.

The control device 100 sets a plurality of combinations consisting of one or a plurality of evaluation lighting patterns xi selected from a plurality of evaluation lighting patterns xi, calculates for each combination the sum of evaluation values corresponding to each of the one or plurality of evaluation lighting patterns xi contained in one combination, and displays the lighting pattern shown by the combination and the sum of the evaluation values in the user interface screen 700.

Specifically, as shown in FIG. 12, in a result region 710 which shows the result of the processing for determining the lighting pattern for measurement L, the lighting pattern represented by the coefficient $1i$ is displayed by illumination images 712, and score values 714 which are the evaluation result under the coefficient $1i$ are displayed. The processing for determining the lighting pattern for measurement L is started, for example, when a search button 647 in FIG. 11 is operated. When the processing is ended, the screen is switched to the user interface screen 700 shown in FIG. 12, and the processing result is displayed in the result region 710.

In the result region 710, a plurality of lighting patterns with different coefficients $1i$ is displayed and the score values 714 under each coefficient $1i$ is displayed. Here, the lighting pattern, which is calculated by the linear combination of the evaluation lighting pattern xi that uses the coefficient $1i$ as the coefficient of the evaluation lighting pattern xi, is configured by combining the evaluation lighting pattern xi consisting of one or a plurality of evaluation lighting patterns xi selected from a plurality of evaluation lighting patterns xi as shown by equation (8). Therefore, the lighting patterns with different coefficients $1i$ mean the lighting patterns in which the combinations of the evaluation lighting patterns xi are different.

In addition, the score value is calculated by equation (7). That is, the score value corresponds to the sum of evaluation values corresponding to each of the one or a plurality of evaluation lighting patterns xi contained in one combination.

When the selection of one illumination image 712 from the display plurality of illumination images 712 is received and the OK button 720 is operated in the selection state, the lighting pattern shown by the selected illumination image 712 is determined as the lighting pattern for measurement L. On the other hand, when the cancel button 730 is operated, the processing is ended without determining the lighting pattern for measurement L. For example, based on the receiving of the operation to the cancel button 730, the control device 100 may switch the display to the user interface screen 600 used to set the information required for the calculation of the evaluation value P.

The control device 100 may also receive the selection to the lighting pattern shown by the displayed coefficient $1i$ and display the images during the image taking under the selected lighting pattern. The user interface screen 700 includes an image display region 740 which displays the images during the image taking under the selected lighting pattern.

For example, when one lighting pattern is selected from the candidates of lighting patterns contained in the result region 710, the control device 100 instructs the illumination device 4 to irradiate illumination light in accordance with the selected lighting pattern, instructs the camera 8 to take images under this lighting pattern and displays the obtained images in the image display region 740. Moreover, the control device 100 may also acquire in advance the images taken under each of the plurality of lighting patterns displayed in the result region.

Figure 13A:
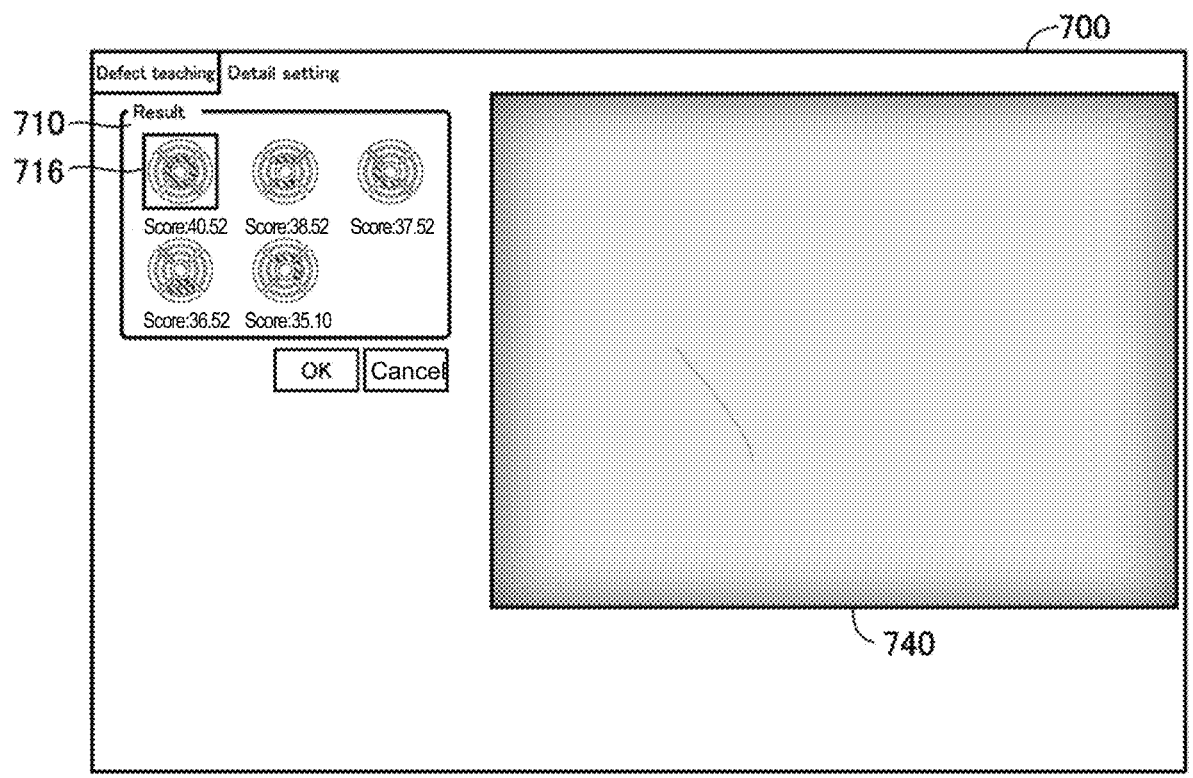
FIG. 13($a$) and FIG. 13($b$) are user interface screens in the case that one lighting pattern is selected.
Figure 13B:
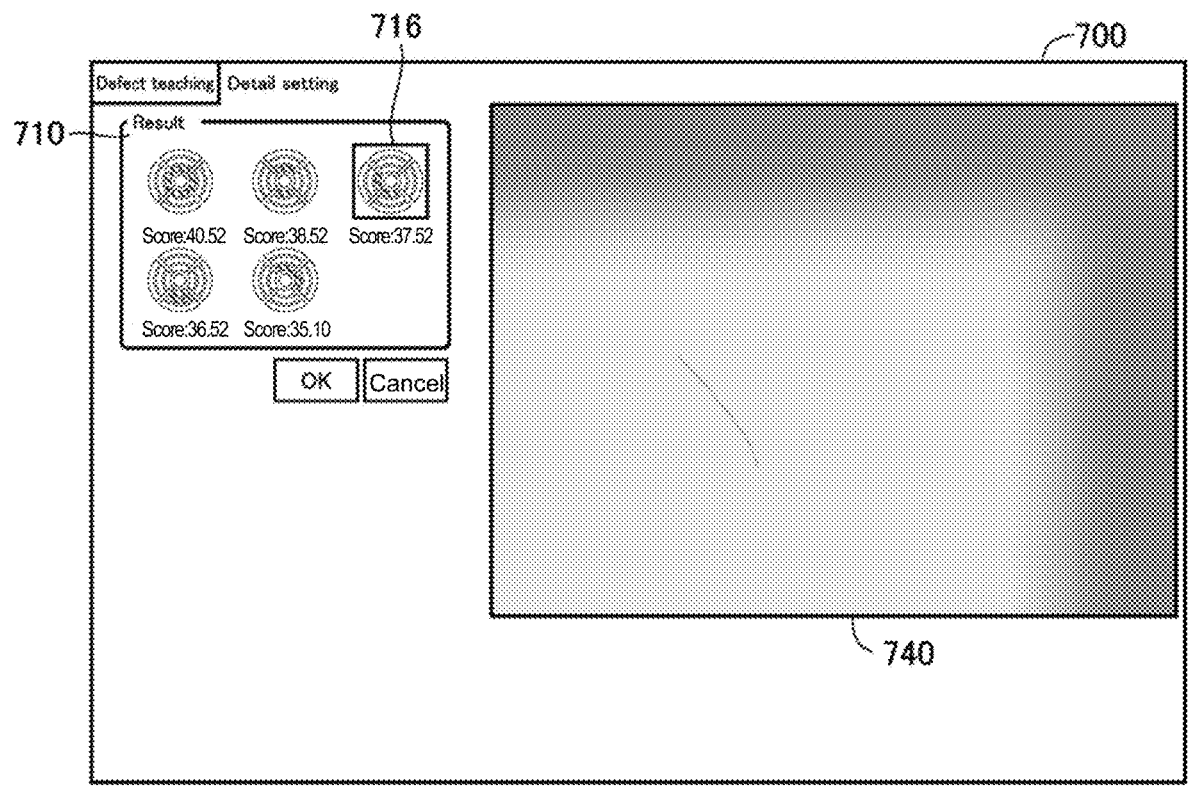

FIG. 13(a) and FIG. 13(b) are the user interface screen 700 when one lighting pattern is selected. As shown in FIG. 13, when one lighting pattern is selected, the lighting pattern being selected is displayed in a selection frame 716 that is shown, and the images taken under the selected lighting pattern are displayed in the image display region 740. When different lighting patterns are selected, the display is switched from FIG. 13(a) to FIG. 13(b) or in a manner as from FIG. 13(b) to FIG. 13(a).

Accordingly, the user can determine the lighting pattern for measurement L after the confirmation of not only the score value but also the images actually taken.

K. Functional Configuration of Control Device 100

Figure 14:
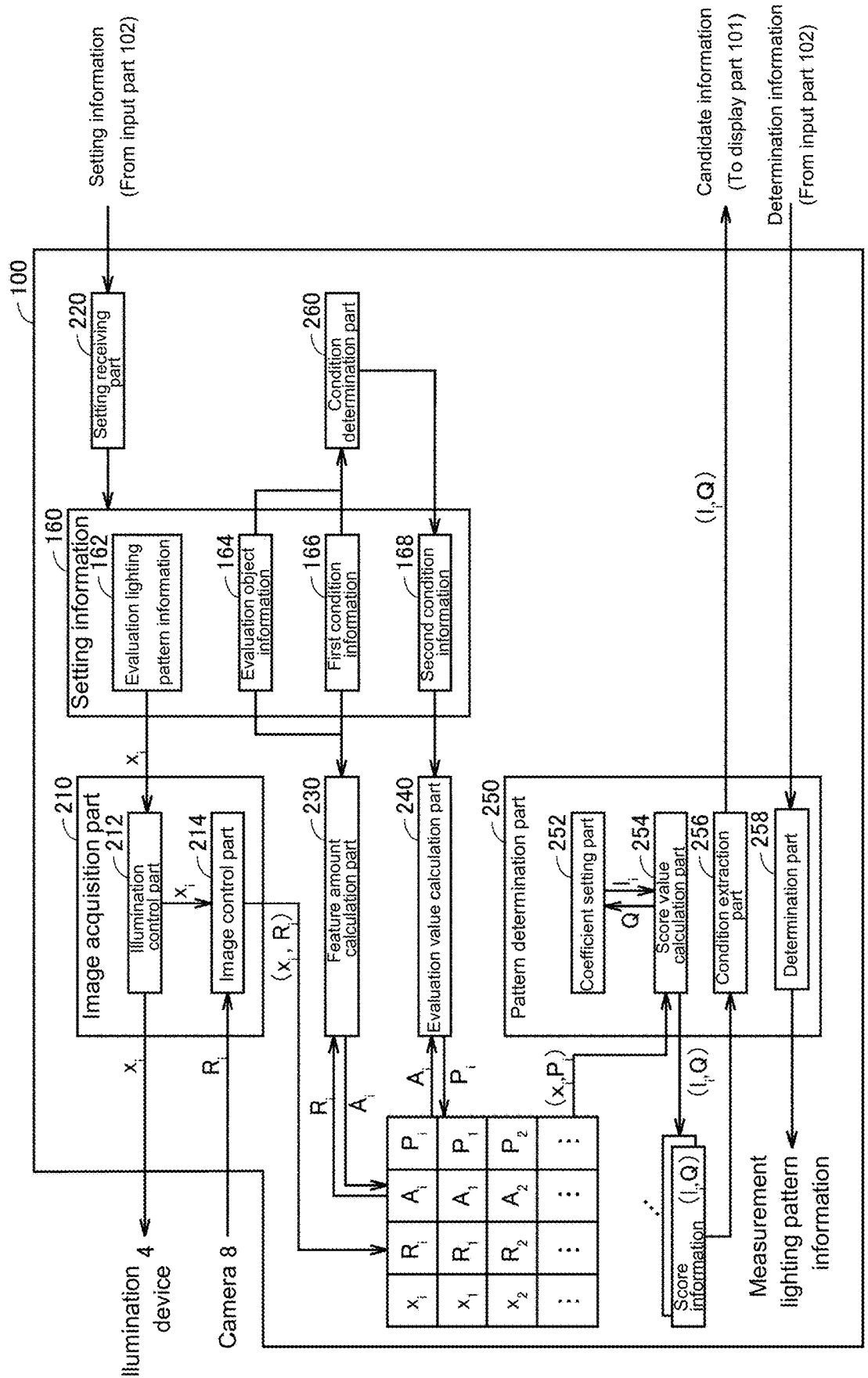
FIG. 14 is a diagram schematically showing one example of a functional configuration of a control device.

FIG. 14 is a diagram schematically showing an example of functional configuration of the control device 100. By executing the control program 150, the control device 100 controls each configuration shown in FIG. 14 to determine the lighting pattern for measurement L.

The control device 100 includes the image acquisition part 210, the setting receiving part 220, the feature amount calculation part 230, the evaluation value calculation part 240, and the pattern determination part 250.

The image acquisition part 210 acquires the evaluation images R from the camera 8. More specifically, the image acquisition part 210 includes an illumination control part 212 and an image control part 214.

The illumination control part 212 controls the illumination device 4 in a manner of irradiating illumination light from the illumination device 4 in accordance with the evaluation lighting patterns xi stored in advance as evaluation lighting pattern information 162 in a memory part such as the hard disk 120 and the like, and informs the image control part 214 of the evaluation lighting pattern xi being lighted.

The image control part 214 receives the information of the evaluation lighting pattern xi and sends an imaging instruction to the camera 8, acquires the evaluation image Ri and associates the evaluation lighting pattern xi with the evaluation image Ri to store in a memory part such as the RAM 112 and the like.

The setting receiving part 220 stores the information that is input via the user interface screen 600 shown in FIG. 9-FIG. 11 in a memory part such as the hard disk 120 and the like as setting information 160. The setting information 160 includes evaluation lighting pattern information 162 related to the evaluation lighting pattern xi, evaluation object information 164 used to specify the evaluation object, first condition information 166 showing the calculation condition of the feature amount A, and second condition information 168 showing the calculation condition of the evaluation value Pi defined based on the evaluation object information 164 and the first condition information 166.

The evaluation object information 164 includes information that specifies the image set as the evaluation object, information that specifies the region which is in the image set as the evaluation object and is set as the evaluation object, label information of the region set as the evaluation object, and so on.

The second condition information 168 in the information that specifying the calculation method of the feature amount A, for example, the information that shows which information among the information of contrast, color average, color deviation, edge amount and so on is the feature amount A.

The control device 100 may also include a condition determination part 260. The condition determination part 260 determines the calculation method of the evaluation value based on the evaluation object information 164 and the first condition information 166, and stores the calculation method in the hard disk 120 as the second condition information 168. For example, when only the attention region H1 is set as the evaluation object region, based on the label information set for the attention region H1, the condition determination part 260 determines to calculate the variation amount of the feature amount within the attention region H1 as the evaluation value.

Based on the evaluation object information 164 and the first condition information 166, the feature amount calculation part 230 calculates the feature amount from the evaluation image Ri stored in the RAM 112, associates the calculated feature amount Ai with the evaluation lighting pattern xi and stores in the RAM 112.

Based on the feature amount Ai stored in the RAM 112 and the second condition information 168, the evaluation value calculation part 240 calculates the evaluation value Pi for each evaluation lighting pattern xi, associates the calculated evaluation value Pi with the evaluation lighting pattern xi and stores in the RAM 112. The condition determination part 260 determines the second condition information 168 based on the feature amount Ai obtained from the evaluation object that is set and the label information set for the evaluation object. In other words, the evaluation value calculation part 240 calculates the evaluation value Pi based on the feature amount Ai obtained from the evaluation object and the label information set for the evaluation object.

The pattern determination part 250 includes a coefficient setting part 252, a score value calculation part 254, a condition extraction part 256, and a determination part 258.

The coefficient setting part 252 sets the coefficient $1i$. For example, the coefficient setting part 252 sets the coefficient $1i$, and adjusts the coefficient $1i$ based on the score value calculated by the score value calculation part 254 based on the set coefficient $1i$.

In accordance with equation (7), the score value calculation part 254 calculates the score value from the coefficient $1i$ set by the coefficient setting part 252 and the evaluation value Pi calculated by the evaluation value calculation part 240, returns a score value Q to the coefficient setting part 252, associates the score value Q with the coefficient $1i$ and stores in a memory part such as the RAM 112 and the like.

In accordance with the correspondence relation between the score value Q and the coefficient $1i$ stored in a memory part such as the RAM 112 and the like and the constraint condition defined based on the feature amount A, the condition extraction part 256 selects a plurality of coefficients $1i$ having high score values, associates the information showing the lighting pattern shown by the coefficient $1i$ with the score value Q corresponding to the coefficient $1i$ and displays in the display part 101.

The determination part 258, determines the lighting pattern for measurement L based on the information from the touch panel 102 which is an input part. The determination part 258 stores the determined lighting pattern for measurement L in a memory part such as the hard disk 120 and the like.

Moreover, the determination part 258 may also determine the lighting pattern for measurement L without depending on the information from the touch panel 102. In this case, the condition extraction part 256 may not be arranged. In addition, the determination part 258 may display the determined lighting pattern for measurement L in the display part 101. In addition, the image acquisition part 210 may be instructed so as to image the target W under the lighting pattern for measurement L, and the acquired images may be displayed in the display part 101.

L. Operation/Effect

As described above, the image processing system 1 includes the camera 8 that images the target W, the illumination device 4 configured of a plurality of partial regions 40 and capable of lighting each partial region 40, and the control device 100 that controls the processing executed in the image processing system 1. The control device 100 includes the image acquisition part 210 that acquires the evaluation images Ri taken and obtained under each evaluation lighting pattern xi, the setting receiving part 220 that receives the setting of the region which is in the evaluation image Ri obtained for each evaluation lighting pattern xi and becomes the evaluation object, the feature amount calculation part 230 that calculates the feature amount A from the range of the evaluation object received by the setting receiving part 220, and the evaluation value calculation part 240 that calculates the evaluation value Pi of the evaluation lighting pattern xi from the feature amount A. Besides, the control device 100 includes the pattern determination part 250 which determines the lighting pattern for measurement L by using the coefficient $1i$ determined based on the evaluation value Pi to calculate the linear combination of the evaluation lighting pattern xi.

The evaluation lighting patterns xi are evaluated one by one to calculate the evaluation value Pi, and the coefficient $1i$ determined based on the evaluation value Pi is used to linearly combine each evaluation lighting pattern xi to determine the lighting pattern for measurement L. Therefore, even if all the lighting patterns implemented using a plurality of partial regions 40 are not tried, the images may be taken under only a plurality of predetermined evaluation lighting patterns xi, and the lighting setting of the illumination device 4 can be performed easily.

Furthermore, the evaluation lighting pattern xi is a pattern that lights the light sources within one partial regions 40 and does not light the light sources within other partial regions 40. That is, the evaluation value Pi means a value that shows the evaluation to the light irradiated from a predetermined direction to the target W, and the light irradiated to the target W from all directions can be evaluated separately.

Furthermore, the illumination device 4 can independently light the red light source r, the green light source g, and the blue light source b having mutually different wavelength bands of the main wavelength. Therefore, color of the light can also be adjusted and more accurate image measurement can be performed. Besides, because the wavelength bands of the main wavelength are mutually different, the evaluation value of the lighting pattern that lights plural kinds of light sources can be substantially calculated by linearly combining the evaluation value of the lighting pattern that lights the red light source r, the evaluation value of the lighting pattern that lights the green light source g, and the evaluation value of the lighting pattern that lights the blue light source b.

Furthermore, the evaluation information received by the setting receiving part 220 via the user interface screen 600 includes the evaluation object information 164. The evaluation object information 164 includes the information specifying the image of the evaluation object, the information specifying the region that is in the image set as the evaluation object and that is set as the evaluation object, and the label information of the region set as the evaluation object. Besides, the evaluation value calculation part 240 calculates the evaluation value Pi based on the feature amount Ai obtained from the evaluation object and the label information set for the evaluation object. Therefore, the flexibility of the method to calculate the evaluation value increases, and the user can calculate the evaluation value according to the content of the image measurement.

Furthermore, the label information is at least one piece of information of the information showing the existence of defects and the information showing the nonexistence of defects. Therefore, the lighting pattern suitable for defect inspection can be determined.

Furthermore, the feature amount is at least one of contrast, color average, color deviation, and edge amount. That is, the evaluation lighting pattern can be evaluated based on various kinds of feature amount, and thus the user can evaluate the evaluation lighting pattern according to the content of the image measurement.

Furthermore, the evaluation value calculation part 240 calculates the evaluation value Pi based on the magnitude of the difference between the feature amount of the attention region H1 and the feature amount of the non-attention region H2 or on the variation amount of the feature amount within the attention region H1. Therefore, in the image measurement, the lighting pattern in which the deviation of the feature amount in the image can be determined.

Furthermore, the coefficient setting part 252 sets a plurality of coefficients 1i. The score value calculation part 254 calculates the score value Q corresponding to each of the set coefficients 1i. The score value Q corresponds to the sum of the evaluation values corresponding to each of one or a plurality of evaluation lighting patterns xi contained in one combination. That is, a plurality of combinations of the evaluation lighting patterns consisting of one or a plurality of evaluation lighting patterns selected from a plurality of evaluation lighting patterns is set by the coefficient setting part 252 and the score value calculation part 254, and the sum of the evaluation values corresponding to the evaluation lighting patterns contained in each combination is calculated. Therefore, the lighting pattern consisting of the combination of the evaluation lighting patterns can be easily evaluated based on the score value.

Furthermore, the condition extraction part 256 associates the information showing the lighting pattern shown by the coefficient 1i with the score value Q corresponding to the coefficient 1i and displays in the display part 101. Specifically, in the user interface screen 700, in the result region 710, the lighting pattern shown by the coefficient 1i is displayed by the illumination image 712, and the score value 714 which is the evaluation result under the coefficient 1i is also displayed. Besides, as for the lighting pattern selected via the user interface screen 700, the determination part 258 determines the lighting pattern for measurement L. Therefore, the user can select the lighting pattern based on the score value, and thus a highly illustrative lighting pattern for measurement L can be set. In addition, because the score value and the information showing the lighting pattern are associated to be displayed, the user can determine the lighting pattern for measurement L after confirming the selected lighting pattern.

M. Variation Example of Evaluation Method

In the aforementioned embodiment, the example is described in which one evaluation image Ri is acquired for one evaluation lighting pattern xi. It may also be that a plurality of evaluation images Ri are acquired for one evaluation lighting pattern xi and the evaluation value Pi is calculated from the feature amount obtained from each of the plurality of evaluation images Ri.

Figure 15:
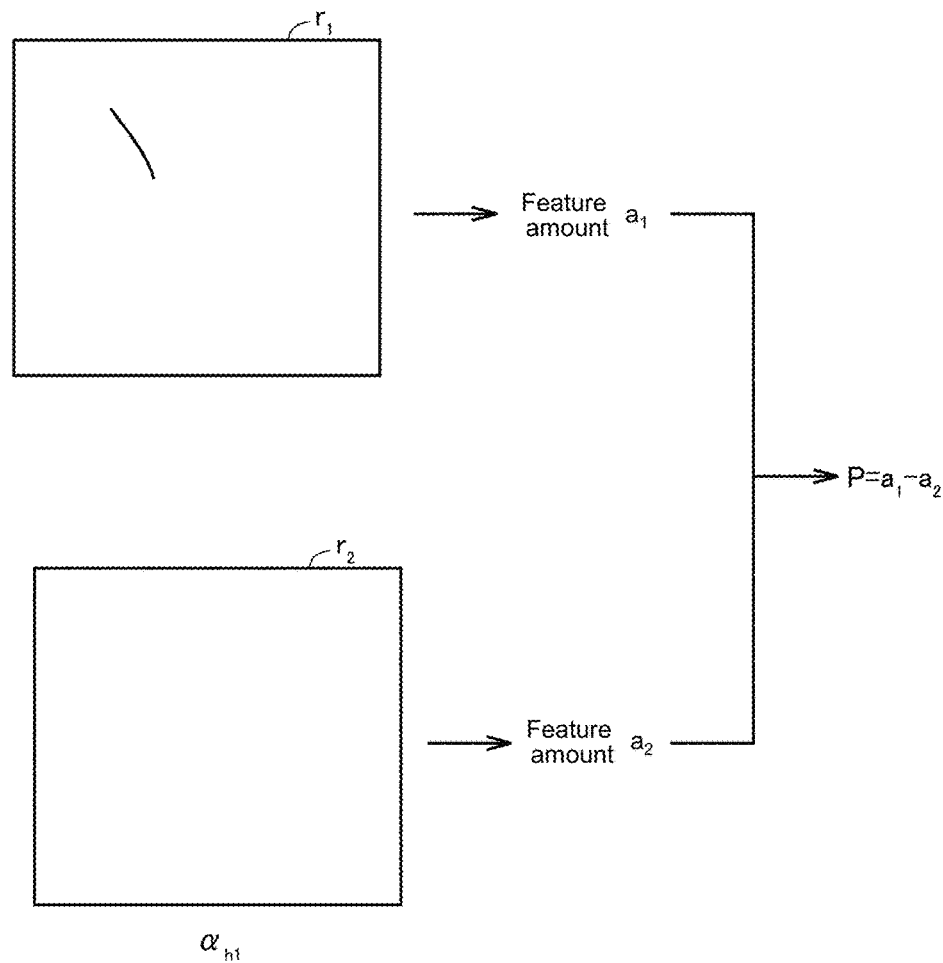
FIG. 15 is a diagram showing a variation example of an evaluation method.

FIG. 15 is a diagram showing a variation example of the evaluation method. As shown in FIG. 15, a first evaluation image r1 containing the feature region and a second evaluation image r2 not containing the feature region may be acquired, and the difference between a feature amount a1 of the first evaluation image and a feature amount a2 of the second evaluation image is set as the evaluation value Pi. Besides, it may be that a plurality of evaluation images containing the feature region is acquired, the variation amounts in the evaluation images are calculated from the evaluation images and the average of a plurality of the calculated variation amounts is set as the evaluation value Pi. Besides, it may be that the attention region H1 and the non-attention region H2 are set in each evaluation image, the difference between the feature amount A1 of the attention region H1 and the feature amount A2 of the non-attention region H2 is calculated from each evaluation image, and the average of a plurality of the calculated differences is set as the evaluation value Pi.

In addition, the feature amount extracted from one attention region H1 may be color deviation, and the color deviation is set as the evaluation value Pi. That is, the feature amount of the attention region H1 may be set as the evaluation value.

N. Variation Example of Evaluation Lighting Pattern

Figure 16:
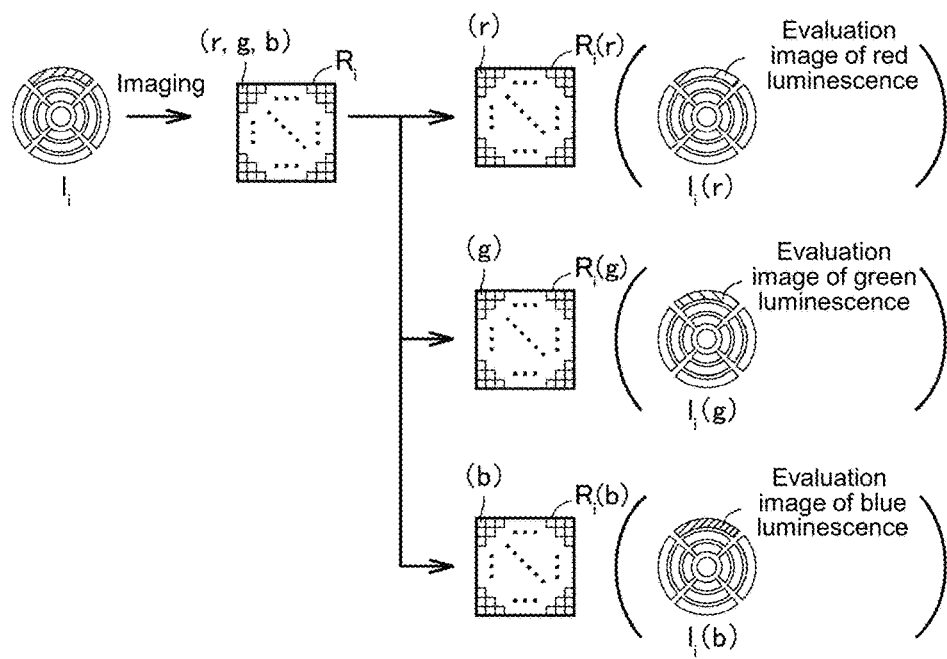
FIG. 16 is a diagram showing variation example 1 of an evaluation lighting pattern.
Figure 17:
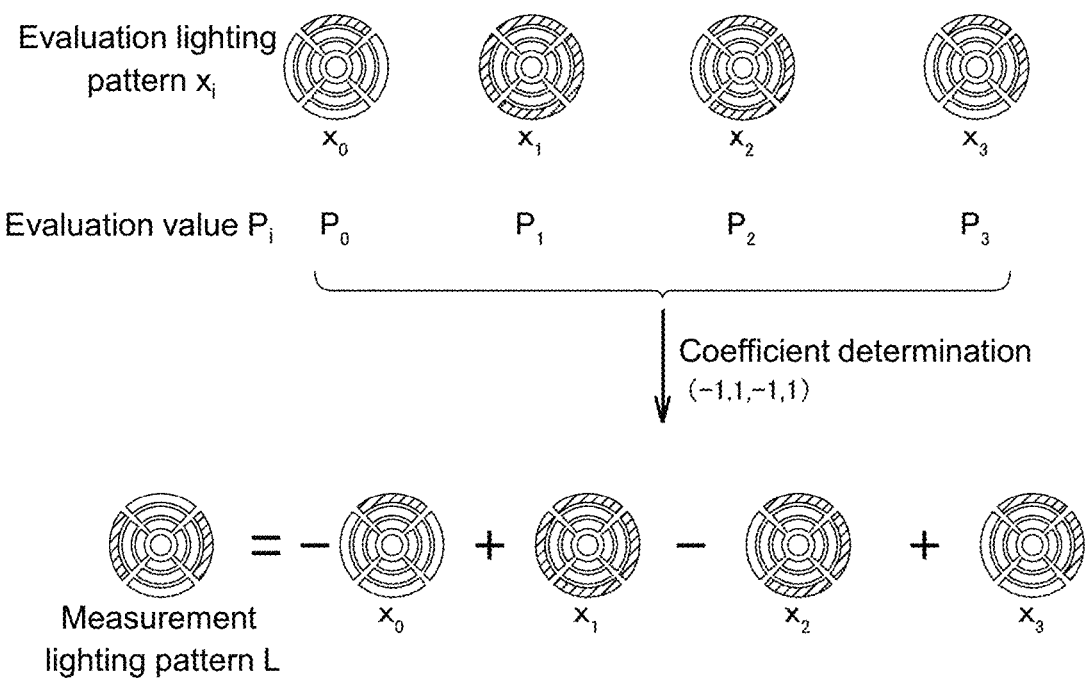
FIG. 17 is a diagram showing variation example 2 of an evaluation lighting pattern.

In the aforementioned embodiment, each evaluation lighting pattern xi is described as a pattern that lights one kind of light source contained in one partial region. However, the evaluation lighting pattern is not limited thereto. FIG. 16 is a diagram showing variation example 1 of the evaluation lighting pattern. FIG. 17 is a diagram showing variation example 2 of the evaluation lighting pattern.

For example, the example shown in FIG. 16 is an example in which the pattern that lights all the light sources contained in one partial region 40 is set as the evaluation lighting pattern. In this case, the control device 100 acquires a color image as the evaluation image Ri. The pixel value representing the red color contained in each of a plurality of pixels forming the color image is extracted, the red evaluation image Ri(r) formed by the pixel value representing red color is set as the evaluation image of the red evaluation lighting pattern xi(r) in which only red is lighted under the evaluation lighting pattern xi corresponding to the evaluation image. Similarly, the green evaluation image Ri(g) is set as the evaluation image of the green evaluation lighting pattern xi(g), and the blue evaluation image Ri(b) is set as the evaluation image of the blue evaluation lighting pattern xi(b).

In this way, similar to this embodiment, the evaluation image can be substantially acquired for each pattern in which one kind of light source contained in one partial region is lighted. In this way, the times of imaging can be reduced.

The example shown in FIG. 17 is an example in which a pattern that lights a plurality of partial regions 40 is set as the evaluation lighting pattern xi. In this case, the coefficient $1i$ may be a negative value, and the mathematical optimization problem of equation (1) can be solved by adding a constraint condition that the light quantity b of the light irradiated from each partial region 40 must be a negative value.

In the example shown in FIG. 17, based on evaluation values P0-P3 of each of the evaluation lighting patterns x0-x3, (10, 11, 12, 13=(−, 1, −1, 1) is determine as the coefficient and the lighting pattern for measurement L is determined.

O. Variation Example of Calculation Method of Evaluation Value

In the aforementioned embodiment, the evaluation value Pi is set to be a value that shows the magnitude of the difference between the feature amount of the feature region h1 in the evaluation image Ri and the feature amount of the non-feature region h2 other than the feature region. The evaluation value Pi is not limited to the value that shows the magnitude of the difference between the feature amount of the feature region h1 and the feature amount of the non-feature region h2 other than the feature region, and may also be a value that shows a detection accuracy of edge detection, and so on.

P. Other Variation Examples (1) In this embodiment, the example in which the camera 8 and the illumination device 4 are separately formed is shown, but the camera 8 and the illumination device 4 may also be integral.

(2) In this embodiment, the illumination device 4 has a dome shape, but the illumination device 4 may also be a flat plate illumination device or has a ring shape. In addition, the illumination device 4 is arranged on the optical axis of the camera 8, but the position of the illumination device 4 may not be arranged on the optical axis of the camera 8.

(3) The coefficient $1i$ is set to be an integer number but is not limited thereto. For example, the range of the coefficient $1i$ may be $0 \leq 1i \leq 1$. In this way, the light quantity b of the light irradiated from each partial region 40 can be weakened or strengthened for adjustment, and thus more sophisticated setting can be performed.

Q. Appendix

As described above, this embodiment includes disclosures as mentioned below.

[Configuration 1]

An image processing system, which is an image processing system (1) that performs image measurement using appearance images of a target (W), comprising:

an imaging part (8) that images the target (W);

an illumination part (4) configured of a plurality of illumination elements (40) for irradiating light to the target (W) and capable of adjusting light emission intensity for each illumination element (40);

an image acquisition part (210) that irradiates illumination light from the illumination part (4) in accordance with each of a plurality of mutually different evaluation lighting patterns (xi), and that acquires at least one or more evaluation image (Ri) corresponding to each evaluation lighting pattern (xi) from the imaging part (8);

a setting receiving part (220) that receives settings of an evaluation object image (Ri) to be evaluated among the evaluation images (Ri) acquired by the image acquisition part (210) and evaluation object regions (H1, H2) to be evaluated which are partial regions of one image;

a feature amount calculation part (230) that calculates a feature amount (Ai) from the evaluation object region (H1, H2) in the evaluation object image (Ri) corresponding to each evaluation lighting pattern (xi);

an evaluation value calculation part (240) that calculates evaluation values (Pi) corresponding to the evaluation lighting patterns (xi) based on the feature amount (Ai) obtained by the feature amount calculation part (230); and a pattern determination part (250) that calculates a linear combination of the evaluation lighting patterns (xi) by using coefficients ($1i$) determined based on the evaluation values (Pi) obtained by the evaluation value calculation part (240), thereby determining a lighting pattern (L) used for the image measurement.

[Configuration 2]

The image processing system recited in configuration 1, wherein the evaluation lighting pattern (xi) may be a pattern in which one of the illumination elements or an assembly of the illumination elements located near each other is lighted and other illumination elements are not lighted.

[Configuration 3]

The image processing system recited in configuration 1 or 2, wherein the illumination part is configured to be capable of selectively irradiating a light (r) using a first wavelength as a main wavelength and lights (g, b) using a second wavelength having a wavelength band different from the first wavelength as the main wavelength.

[Configuration 4]

The image processing system recited in configuration 1, wherein the setting receiving part (220) further receives label information (164) that corresponds to the evaluation object image and the evaluation object regions, and the evaluation value calculation part (240) calculates the evaluation value (Pi) based on the correspondence relation between the feature amount (Ai) obtained from the evaluation object regions and the label information (164) that corresponds to the evaluation object regions.

[Configuration 5]

The image processing system recited in configuration 4, wherein the label information is the information (642) that represents a state that defects exist in the evaluation object images and the evaluation object regions or the information that represents a state that defects do not exist.

[Configuration 6]

The image processing system recited in any one of configurations 1 to 5, wherein the feature amount is at least one (644, 645) of contrast, color average, color deviation and edge amount.

[Configuration 7]

The image processing system recited in any one of configurations 4 to 6, wherein the evaluation value calculation part (240) calculates the evaluation value based on the magnitude (A1, A2) of a difference between the feature amounts calculated in two regions among the evaluation object images and the evaluation object regions, or the feature amount calculated in one region among the evaluation object images and the evaluation object regions, or the magnitude (A'1, A'2) of the variation of the feature amounts calculated in the region.

[Configuration 8]

The image processing system recited in configuration 7, wherein the pattern determination part sets a plurality of combinations of evaluation lighting patterns consisting of one or a plurality of evaluation lighting patterns that is selected from the plurality of evaluation lighting patterns (252, 256), and calculates a sum of the evaluation values corresponding to the evaluation lighting patterns included in each combination (254).

[Configuration 9]

The image processing system recited in configuration 8, wherein the pattern determination part displays lighting patterns (712) represented by the combination and the sum (714) of the corresponding evaluation values (256), receives a selection to the displayed combination (716), and determines the lighting pattern represented by the selected combination as the lighting pattern to be used in the image measurement (720,258).

[Configuration 10]

A setting method, which is a setting method used to perform lighting setting on an illumination part that is configured of a plurality of illumination elements for irradiating light to a target and configured to adjust a light emission intensity for each illumination element, the method comprising:

a step (S10) of irradiating illumination light from the illumination part in accordance with each of a plurality of mutually different evaluation lighting patterns, and acquiring at least one or more evaluation images corresponding to each evaluation lighting pattern from an imaging part; a step (S20) of calculating a feature amount from an evaluation object region in an evaluation object image among the one or more evaluation images corresponding to each evaluation lighting pattern;

a step (S30) of calculating an evaluation value corresponding to the evaluation lighting patterns based on the calculated feature amount; and a step (S40) calculating a linear combination of the evaluation lighting patterns by using coefficients determined based on the calculated evaluation values, thereby determining a lighting pattern used for image measurement.

It should be considered that each embodiment disclosed here is illustrative rather than limitative in all aspects. The scope of the disclosure is shown by the scope of the claims instead of by the description above, and meanings equivalent to the scope of the claims and all modifications within the scope are intended to be included. In addition, the embodiments and each variation example are intended to be implemented individually or in combination whenever possible.

What is claimed is:

1. An image processing system that performs image measurement using appearance images of a target, comprising:

a camera that images the target;

an illumination device configured of a plurality of illumination elements for irradiating light to the target and configured to adjust a light emission intensity for each of the illumination elements; and a processor, being configured to:

irradiate illumination light from the illumination device in accordance with each of a plurality of mutually different evaluation lighting patterns and acquires at least one or more evaluation images corresponding to each evaluation lighting pattern from the camera;

receive settings of an evaluation object image to be evaluated among the evaluation images and evaluation object regions to be evaluated which are partial regions of one image;

calculate a feature amount from the evaluation object region in the evaluation object image corresponding to each evaluation lighting pattern;

calculate evaluation values corresponding to the evaluation lighting patterns based on the feature amount; and calculate a linear combination of the evaluation lighting patterns by using coefficients determined based on the evaluation values, thereby determining a lighting pattern used for the image measurement.

2. The image processing system according to claim 1, wherein the evaluation lighting pattern is a pattern in which one of the illumination elements or an assembly of the illumination elements located near each other is lighted and other illumination elements are not lighted.

3. The image processing system according to claim 2, wherein the feature amount is at least one of contrast, color average, color deviation and edge amount.

4. The image processing system according to claim 1, wherein the illumination device is configured to selectively irradiate a light using a first wavelength as a main wavelength and a light using a second wavelength having a wavelength band different from the first wavelength as the main wavelength.

5. The image processing system according to claim 4, wherein the feature amount is at least one of contrast, color average, color deviation and edge amount.

6. The image processing system according to claim 1, wherein the processor further receives label information that corresponds to the evaluation object image and the evaluation object region, and calculates the evaluation value based on the correspondence relation between the feature amount obtained from the evaluation object region and the label information corresponding to the evaluation object region.

7. The image processing system according to claim 6, wherein the label information is an information that represents a state that defects exist in the evaluation object image and the evaluation object region or an information that represents a state that defects do not exist.

8. The image processing system according to claim 7, wherein the feature amount is at least one of contrast, color average, color deviation and edge amount.

9. The image processing system according to claim 7, wherein the processor calculates the evaluation value based on a magnitude of a difference between the feature amounts calculated in two regions among the evaluation object images and the evaluation object regions, or the feature amount calculated in one region among the evaluation object images and the evaluation object regions, or a magnitude of a variation of the feature amounts calculated in the region.

10. The image processing system according to claim 6, wherein the processor calculates the evaluation value based on a magnitude of a difference between the feature amounts calculated in two regions among the evaluation object images and the evaluation object regions, or the feature amount calculated in one region among the evaluation object images and the evaluation object regions, or a magnitude of a variation of the feature amounts calculated in the region.

11. The image processing system according to claim 10, wherein the processor sets a plurality of combinations of evaluation lighting patterns consisting of one or a plurality of evaluation lighting patterns that is selected from the plurality of evaluation lighting patterns, and calculates a sum of the evaluation values corresponding to the evaluation lighting patterns included in each combination.

12. The image processing system according to claim 11, wherein the processor:
    displays the lighting patterns represented by the combinations and the sum of the corresponding evaluation values, receives a selection to the displayed combination, and
    determines the lighting pattern represented by the selected combination as the lighting pattern to be used in the image measurement.

13. The image processing system according to claim 6, wherein the feature amount is at least one of contrast, color average, color deviation and edge amount.

14. The image processing system according to claim 1, wherein the feature amount is at least one of contrast, color average, color deviation and edge amount.

15. The image processing system according to claim 14, wherein the processor calculates the evaluation value based on a magnitude of a difference between the feature amounts calculated in two regions among the evaluation object images and the evaluation object regions, or the feature amount calculated in one region among the evaluation object images and the evaluation object regions, or a magnitude of a variation of the feature amounts calculated in the region.

16. The image processing system according to claim 1, wherein the illumination device is configured to selectively irradiate a light using a first wavelength as a main wavelength and a light using a second wavelength having a wavelength band different from the first wavelength as the main wavelength.

17. The image processing system according to claim 16, wherein the feature amount is at least one of contrast, color average, color deviation and edge amount.

18. A setting method that is used to perform lighting setting on an illumination device that is configured of a plurality of illumination elements for irradiating light to a target and configured to adjust a light emission intensity for each of the illumination elements, the method comprising:
    irradiating illumination light from the illumination device in accordance with each of a plurality of mutually different evaluation lighting patterns, and acquiring at least one or more evaluation images corresponding to each evaluation lighting pattern from a camera;
    calculating a feature amount from an evaluation object region in an evaluation object image among the one or more evaluation images corresponding to each evaluation lighting pattern;
    calculating an evaluation values corresponding to the evaluation lighting patterns based on the calculated feature amount; and
    calculating a linear combination of the evaluation lighting patterns by using coefficients determined based on the calculated evaluation values, thereby determining a lighting pattern used for image measurement.

* * * * *